United States Patent
Doi et al.

(10) Patent No.: US 6,378,999 B1
(45) Date of Patent: Apr. 30, 2002

(54) AQUEOUS INK JET RECORDING LIQUID AND INK JET RECORDING METHOD

(75) Inventors: Takatsugu Doi; Nobuyuki Ichizawa; Atsushi Suzuki; Kyoko Horinouchi; Toshitake Yui; Ken Hashimoto; Kunichi Yamashita, all of Minami-Ashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/115,767

(22) Filed: Jul. 15, 1998

(30) Foreign Application Priority Data

Jul. 17, 1997 (JP) .............................. 9-192846
Nov. 11, 1997 (JP) .............................. 9-308417

(51) Int. Cl.[7] ............................................. G01D 11/00
(52) U.S. Cl. .................... 347/100; 347/96; 347/101; 347/105
(58) Field of Search .......................... 347/100, 96, 105, 347/101; 106/31.27

(56) References Cited

U.S. PATENT DOCUMENTS

| | | | |
|---|---|---|---|
| 5,085,698 A | | 2/1992 | Ma et al. |
| 5,106,417 A | * | 4/1992 | Hauser et al. ............... 347/100 |
| 5,172,133 A | * | 12/1992 | Suga et al. ................ 347/100 |
| 5,221,334 A | * | 6/1993 | Ma et al. ................... 347/100 |
| 5,585,189 A | * | 12/1996 | Inoue et al. ................ 428/461 |
| 5,679,451 A | * | 10/1997 | Kondo et al. ............... 347/105 |
| 6,033,463 A | * | 3/2000 | Yui et al. ................. 106/31.27 |
| 6,126,268 A | * | 10/2000 | Askeland et al. ............. 347/96 |

FOREIGN PATENT DOCUMENTS

| | | |
|---|---|---|
| JP | A-56-147871 | 11/1981 |
| JP | A-1-204979 | 8/1989 |
| JP | A-5-331391 | 12/1993 |
| JP | A-6-1936 | 1/1994 |
| JP | A-7-331147 | 12/1995 |
| JP | 08-020738 | 1/1996 |
| JP | A-8-151546 | 6/1996 |

* cited by examiner

Primary Examiner—John Barlow
Assistant Examiner—Manish S Shah
(74) Attorney, Agent, or Firm—Oliff & Berridge, PLC

(57) ABSTRACT

In an aqueous ink jet recording liquid including at least water, a water-soluble organic solvent and a water-insoluble coloring material, (1) the absolute value of the zeta potential is 20 mV or more, (2) the conductivity is from 0.05 to 0.75 S/m, (3) the number average particle size of dispersed particles is from 15 to 200 nm, and (4) the number of particles having a particle size of 0.5 $\mu$m or more present in one liter is $2.5 \times 10^{11}$ or less. Due to the aforementioned, dispersion stability of the coloring material can be maintained in the ink jet recording liquid in which the water-insoluble coloring material is dispersed, and the aqueous ink jet recording liquid is provided, which is excellent regarding stability over long periods of time, causes no ink flow route clogging and prevents kogation in printing, provides a recorded material having excellent rub resistance, printing quality, optical density, water resistance and lightfastness, and can prevent uneven density.

20 Claims, 2 Drawing Sheets

AQUEOUS INK JET RECORDING LIQUID AND INK JET RECORDING METHOD

BACKGROUND OF THE INVENTION

1. Field of the Invention

The present invention relates to an aqueous ink jet recording liquid used in an ink jet recording method and an ink jet recording method using the same.

2. Description of the Related Art

Printers utilizing an ink jet recording method in which recording is effected on paper, cloth, film and the like by discharging liquid or melted solid ink through nozzles, slits or a porous film or the like have various merits such as compact size, cheapness, silence and the like, and are widely commercially available as black mono-chromatic or full-color printers. Among others, a so-called piezo ink jet method using a piezoelectric element, or a so-called thermal ink jet method in which recording is conducted by forming liquid drops by the action of thermal energy has a lot of merits such as being able to obtain high speed printing and high resolution, and the like.

Conventionally, an water-soluble dye-based ink jet ink generally used in ink jet recording methods has excellent long-term storage stability, but has problems in water resistance and lightfastness. On the other hand, an ink using a pigment as a coloring material has excellent water resistance and lightfastness, and can provide images having high density without bleeding; therefore, such ink is extremely promising, and recently, a lot of proposals regarding the ink have been tried out, or put to actual use. For example, Japanese Patent Application Laid-Open (JP-A) No. 56-47871 proposes a recording liquid composed of an aqueous medium containing at least a pigment, a polymeric dispersant and a non-ionic surfactant. U.S. Pat. Nos. 5,085,698 and 5,221,334 propose an AB or BAB block copolymer as a dispersant for a pigment. U.S. Pat No. 5,172,133 proposes using a specific pigment, a water-soluble resin and a solvent.

The pigment-based ink jet inks has the merits described above, but, at the same time, they had problems in reliability and image-fixing property. One reason for this was that since the pigment is insoluble in the aqueous medium and is dispersed in the aqueous medium, the pigment flocculates. This flocculation of the pigment is believed to occur in cases in which the ink is stored for a long period of time or stored at high temperatures, in cases in which water and the like evaporate and the pigment becomes concentrated at a distal point of a nozzle or relative concentrations of other ink additives increase, or in cases in which a dispersion state of the ink changes due to shock caused by applications of energy pulses for jetting the ink. Such flocculation of the pigment would cause problems in ink jet recording described below, and also is a cause of shortened printing head life.

(1) Physical properties of the ink change, and printing performances varies with this change.

(2) Accumulation of the pigment at an ink flow route or at the tip of the nozzle causes clogging of the nozzle, leading to poor discharging.

(3) Due to pollution of the ink flow route with the pigment, bubbles tend to remain in the ink flow route, and decreased ink jet property and poor discharging occur.

(4) When the ink flow route is polluted with the pigment, particularly in the thermal ink jet method, accumulation of the pigment on a heater can be a cause of burning on the heater (kogation).

Therefore, as methods for suppressing flocculation, methods described below which aim towards improving stability of a dispersed system are disclosed.

Japanese Patent Application Laid-Open (JP-A) No. 5-331391 and the like describe a method in which flocculation of the pigment is suppressed by electrostatic repulsion between molecules, by restricting the amount of a specific ionic impurity to a fixed amount or less, since ionic impurities are known to weaken the electrostatic repulsion between pigment surfaces. Japanese Patent Application Laid-Open (JP-A) Nos. 1-204979 and 6-1936 describe a method in which the particle size of the pigment in the ink is restricted to a fixed level or less, utilizing the fact that when the particle size is smaller, the dispersed system is more stable. Further, as a general theory, a method which utilizes a steric effect of a polymeric dispersant is also known.

In using an ink jet recording apparatus, it is expected that water and a water-soluble organic solvent and the like evaporate at the distal point of the nozzle, and that an ink composition changes greatly from the initial condition. However, there has been made no dispersion stabilization design in which even in such a concentrated condition, the coloring material does not flocculate, and the ink does not undergo excessive thickening and solidification.

SUMMARY OF THE INVENTION

The present invention provides an aqueous ink jet recording liquid which has excellent stability over long periods of time, and in printing, causes no clogging of an ink flow route, prevents kogation, provides a recorded material having excellent rub resistance, printing quality, optical density, water resistance and lightfastness, and can prevent uneven density, due to being able to preserve dispersion stability of a coloring material even in regards to deterioration with age of an ink composition.

The present inventors and the like as a result of earnest studies, have concluded it is essential that the ink jet recording liquid satisfies the following conditions in order to satisfy dispersion stability and printing quality simultaneously.

Namely, the present invention is an aqueous ink jet recording liquid comprising at least water, a water-soluble organic solvent and a water-insoluble coloring material, wherein (1) the absolute value of the zeta potential is 20 mV or more,
(2) the conductivity is from 0.05 to 0.75 S/m,
(3) the number average particle size of dispersed particles is from 15 to 200 nm, and
(4) the number of the particles having a particle size of 0.5 $\mu$m or more present in one liter is $2.5 \times 10^{11}$ or less.

Further, the present invention is preferably an aqueous ink jet recording liquid comprising at least water, a water-soluble organic solvent and a water-insoluble coloring material, wherein (1) the absolute value of the zeta potential is 20 mV or more,
(2) the conductivity is from 0.10 to 0.50 S/m,
(3) the concentration of an alkaline metal ion is from 500 to 3000 ppm,
(4) the number average particle size of dispersed particles is from 20 to 80 nm,
(5) the volume average particle size of the dispersed particles is from 30 to 250 nm, and
(6) the number of the particles having a particle size of 0.5 $\mu$m or more present in one liter is $2.5 \times 10^{11}$ or less.

In the present invention, the above-described conclusions have been reached based on the following considerations.

Namely, in an environment in which ordinary ink jet recording apparatuses are used, since water and a water-soluble organic solvent and the like evaporate from an ink discharging portion, a composition, structure and physical properties of an ink are liable to change, and failures such as nozzle clogging and the like are liable to occur, particularly in the vicinity of the ink discharging portion.

To prevent nozzle clogging, it is possible to consider a method in which the ink is designed so that due to the evaporation of water and the like, the water-insoluble coloring material flocculates, forming a suitable structure, excessive evaporation of water and the like is prevented by this flocculated structure, and printing is made possible by breaking down the flocculated pigment at a tip end of a nozzle by maintenance recovery operations (dummy jet, vacuum suction, wiping and the like) attached to a recording apparatus when carrying out printing, and the like.

In the present invention, it has been decided to carry out an ink design in which the ink composition changes greatly from the initial state, the coloring material dose not flocculate even in a concentrated state, and the ink dose not thicken or solidify. For this purpose, singly controlling the particle size or the conductivity of the water-insoluble coloring material or the like is not effective, and it has been concluded that it is necessary to control the free charge state of the surface of the water-insoluble coloring material in the ink and dispersion stability against in regards to deterioration with age in the condition of the ink.

On the other hand, the ink jet recording liquid is considered to exhibit behavior as described below on a recording material.

(1) Stability of the water-insoluble coloring material decreases and flocculation occurs due to evaporation of water and the water-insoluble organic solvent.

(2) The water-insoluble coloring material permeates the recording material, and the water-insoluble coloring material is fixed onto the recording material.

(3) Electrostatic interaction operates between the recording material and the water-insoluble coloring material, and the water-insoluble coloring material is fixed onto the recording material.

It is considered that when flocculation of the coloring material on the recording material is quick, high optical density and prevention of image bleeding can be attained, but rub resistance of image becomes worse. On the other hand, it is considered that when the water-insoluble coloring material maintains a finely dispersed state even on the recording material, although rub resistance of image is excellent, image bleeding and optical density are poor. Therefore, to prevent image bleeding, impart high optical density and attain excellent fixing property, it is believed to be necessary that the water-insoluble coloring material takes on a suitable flocculated structure on the recording material.

Occurrence of uneven density when printing a pigment ink is closely related to dispersion stability of the ink. Namely, coarse particles remain on paper due to flocculation during storage of the ink and emphasize light and shade to generate "uneven density".

As a result of these considerations, it has been concluded that the ink jet recording liquid of the present invention comprising at least water, the water-soluble organic solvent and the water-insoluble coloring material can satisfy dispersion stability and printing quality simultaneously by satisfying specific conditions regarding the zeta potential, the conductivity, the number average particle size of the dispersed particles, and the number of the particles having a particle size of 0.5 $\mu$m or more present in one liter.

The aqueous ink jet recording liquid of the present invention exhibits excellent characteristics in long-term storage stability, in heat/cold cycles or in allowing the recording liquid to stand in a state in which the print head is filled with the recording liquid and in the like, is excellent in regards to printing characteristics such as nozzle clogging and kogation, and is also excellent in regards to printing qualities such as rub resistance, water resistance, lightfastness, image bleeding, optical density, uneven density and the like.

DETAILED DESCRIPTION OF THE INVENTION

Figure 1:
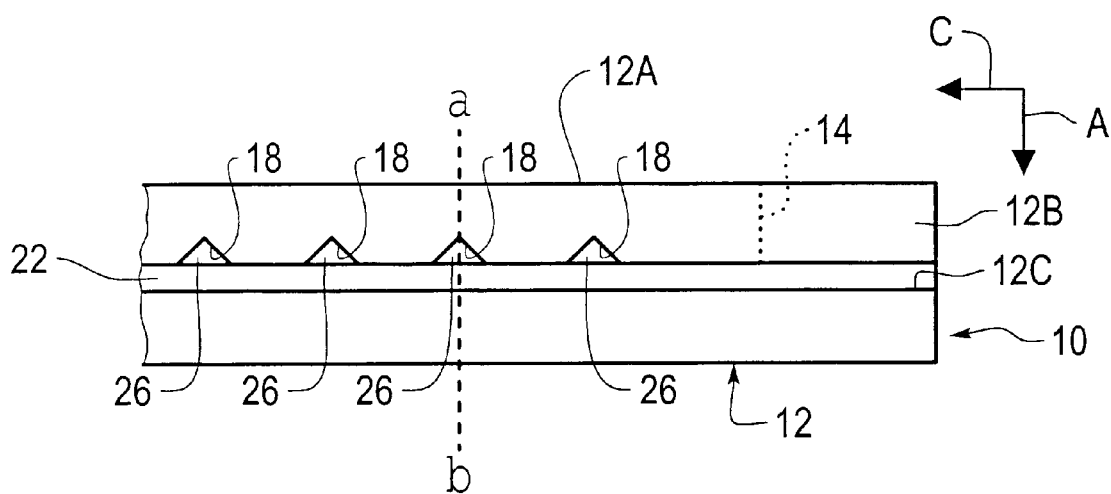
FIG. 1 is a front view illustrating an example of a recording head used in an ink jet recording apparatus using a thermal ink jet method.

While a water-insoluble coloring material is not particularly restricted in the present invention, examples thereof include organic pigments, inorganic pigments, coloring polymer particles, water-insoluble dyes, dispersion dyes, oil-soluble dyes and the like. As black coloring materials, carbon black pigments such as furnace black, lamp black, acetylene black, channel black, and the like are listed, and specific examples which can be used include, but are not limited to: Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (above-described compounds are manufactured by Columbian Carbon Co., Ltd.); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (above-described compounds are manufactured by Cabot Corp.); Color Black FW1, Color Black FW2, Color Black FW2V, Color Black 18, Color Black FW200, Color Black S150, Color Black S160, ColorBlack S170, Pritex 35, Pritex U, Pritex Y, Pritex 140U, Printex 140V, Special Black 6, Special Black 5, Special Black 4A and Special Black 4 (above-described compounds are manufactured by Degussa Corp.); No. 25, No.33, No. 40, No. 47, No. 52, No. 900, No. 2300, MCF-88, MA 600, MA 7, MA 8 and MA 100 (above-described compounds are manufactured by Mitsubishi Chemical Co., Ltd.), and the like. Further, magnetic substance fine particles such as magnetite, ferrite and the like, and titanium black and the like may be used as black pigments.

Examples of cyan coloring materials include, but are not limited to: C. I. Pigment Blue-1, C. I. Pigment Blue-2, C. I. Pigment Blue-3, C. I. Pigment Blue-15, C. I. PigmentBlue-15:1, C. I. Pigment Blue-15:3, C. I. Pigment Blue-15:34, C. I. Pigment Blue-16, C. I. Pigment Blue-22, C. I. Pigment Blue-60, and the like.

Examples of magenta coloring materials include, but are not limited to: C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202 and the like.

Examples of yellow coloring materials include, but are not limited to: C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151, C. I. Pigment Yellow-154, and the like. In addition to a black pigment and three primary color pigments of cyan, magenta and yellow, pigments of specific colors such as red, green, blue, brown, white and the like, pigments of metal gloss such as gold, silver and the like, color less extender pigments, plastic pigments and the like may be used. Further, pigments that were newly synthesized for the present invention may be used. Further, pigments prepared by surface treatment of the above-described pigments can also be used. As surface treatment methods, there are listed as examples: treatments with coupling agents such as an alcohol, an acid, a base, a silane compound and the like; polymer grafting treatment; plasma treatment, and the like.

Further, evenly discussing suitable structures of the coloring materials across the board is difficult; however, in a case in which the coloring material is, for example, carbon black, it is preferable that the carbon black used has a particle size from 15 to 30 nm, a BET specific surface area from 70 to 300 $m^2/g$, a DBP oil absorption from 0.5 to $1.0 \times 10^{-3}$ L/g, a volatile content from 0.5 to 10% by weight and an ash content from 0.01 to 1.0% by weight. If a carbon black outside of the above-described range is used, the size of the dispersed particles in the ink may increase.

As the coloring material us ed in the present invention, one containing a small amount of organic or inorganic impurities is preferable. Coloring materials generally available contain a large amount of impurities. Therefore, in the present invention, it is desirable to use a purified material containing a small amount of impurities. Removal of impurities can be conducted by, for example, washing with water, ultrafiltration membrane method, ion exchange treatment, adsorption by activated carbon, zeolite and the like, and so on. In the ink, the concentration of inorganic materials derived from the impurities in the coloring material is preferably 500 ppm or less, and more preferably 300 ppm or less; however, the concentration is not limited to such a range.

The coloring material used in the ink for ink jet recording of the present invention is used in the range from 0.5 to 20% by weight, and preferably from 2 to 10% by weight based on the weight of the ink.

The above-described coloring material may be dispersed using a dispersant. As the dispersant, a polymeric dispersant, an anionic surfactant, a cationic surfactant, an ampholytic surfactant, a non-ionic surfactant and the like can be used, but a dispersant containing a small amount of impurities is more preferred. Therefore, it is more preferable to use a dispersant prepared in a clean environment.

Even if, in the ink, a small dispersed particle size and a small number of coarse particles can be attained temporarily by centrifugal precipitation and filtering, the attained dispersed particle size and coarse particle amount revert back to the original state under various stress conditions. To make possible storage of the ink for a long period of time the attained dispersed particle size and coarse particle must be continuously maintained even under various stress conditions. As stress that blocks dispersion stability, storage at high temperatures such as storage for a long period of time during the summer season is listed as an example. When a dispersed ink is placed under high temperatures, dispersed particles actively move due to thermal energy and the probability of mutual collision increases, and the ink is liable to flocculate. Particularly, in an ink in which a coloring material is dispersed using a polymeric dispersant, the dispersant and the solvent used play an important role for the purpose of maintaining dispersion stability under stress condition of storage at high temperatures.

As the polymeric dispersant of the present invention, if it is a polymer having a hydrophilic structure portion and a hydrophobic structure portion, effective use is possible; specifically, a homopolymer of a hydrophilic monomer composed of a hydrophilic portion and a hydrophobic portion, or a salt thereof, a copolymer of a hydrophobic monomer component and a hydrophilic monomer component, or a salt thereof, and further, a copolymer prepared by copolymerizing other components as needed, can be used. The copolymer may have any structure such as random, graft, block or the like, and in addition to alkaline metal salts, examples of these salts include, but are not limited to: alcohol amine salts such as monoethanolamine salts, diethanolamine salts, triethanolamine salts and the like; and onium salts of an ammonium ion, sulfonium ion, oxonium ion, stibonium ion, stannonium, iodonium and the like.

Examples of a monomer having an $\alpha,\beta$-ethylenic unsaturated group having a hydrophilic group include monomers having a carboxyl group, a sulfonate group, a hydroxyl group, a phosphate group and the like, for example, acrylic acid, methacrylic acid, crotonic acid, itaconic acid, monoester of itaconic acid, maleic acid, monoester of maleic acid, fumaric acid, monoester of fumaric acid, vinylsulfonic acid, styrenesulfonic acid, sulfonated vinylnaphthalene, vinylalcohol, acrylamide, methacryloxyethyl phosphate, bismethacryloxyethyl phosphate, methacryloxyethylphenylamide phosphate, ethylene glycol dimethacrylate, diethylene glycol dimethacrylate and the like.

A hydrophilic monomer component is contained in the polymer in amount preferably in the range from 0.1 mol % to 100 mol %, and more preferably in the range from 30 mol % to 100 mol %. The acid value corresponding to these ranges is in the range from 100 to 800, preferably from 150 to 800.

Examples of a monomer having an $\alpha,\beta$-ethylenic unsaturated group having a hydrophobic group include: styrene derivatives such as styrene, $\alpha$-methylstyrene, vinyltoluene and the like; vinylcyclohexane; vinylnaphthalene; vinylnaphthalene derivatives; alkyl acrylates; alkyl methacrylates; phenyl methacrylate; cycloalkyl methacrylates; alkyl crotonates; dialkyl itaconates; dialkyl maleates; and the like.

Examples of other components include: acrylamide; acrylamide derivatives; dimethylaminoethyl methacrylate; ethoxyethyl methacrylate; butoxyethyl methacrylate; ethoxytriethylene methacrylates; vinylpyrrolidone; vinylpiridine; alkyl ethers; components containing polyoxyethylene such as methoxypolyethylene glycol methacrylate, polyethylene glycol methacrylate and the like; and components containing a hydroxyl group such as hydroxymethyl methacrylate, hydroxyethyl methacrylate, vinylalcohol and the like.

In addition to the above-mentioned, it is also possible that a condensed polymer (polyester-based condensed polymer) of an unsaturated polycarboxylic acid with alcohols or glycols is used as a hydrophobic component and a hydrophilic monomer component is addition-polymerized with this hydrophobic component to obtain a polymeric dispersant. In addition, water-soluble polymers such as carboxylic acid-denatured polyvinylalcohol, carboxylmethyl cellulose and the like can be used, and the above-described examples are not restrictive.

Examples of preferable copolymers include: a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkylacrylate-acrylic acid copolymer, an alkyl methacrylate-methacrylic acid copolymer, a styrene-alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, and the like. Further, these polymers may be suitably copolymerized with a monomer having a polyoxyethylene group or a hydroxy group. Further, to increase affinity with a pigment having on its surface an acidic functional group and to improve dispersion stability, these polymers may also be suitably copolymerized with a monomer having a cationic functional group, for example, N,N-dimethylaminoethyl methacrylate, N,N-dimethylaminoethyl acrylate, N,N-dimethylaminomethacrylamide, N,N-dimethylaminoacrylamide, N-vinylpyrrole, N-vinylpyridine, N-vinylpyrrolidone, N-vinylimidazole and the like. The copolymer may have any structure such as random, block and graft copolymers or the like.

In a polymeric dispersant having an acidic group as an ionized group, the acidic group is preferably a carboxylic acid or a sulfonic acid, and more preferably, a carboxylic acid. The reason for this is that a carboxylic acid and a sulfonic acid are easily dissociated, and a high surface density of electric charge can be obtained by carrying out suitable pH control. Particularly, if the hydrophilic part has a carboxylate group or a salt thereof, the carboxylate group of the polymeric dispersant surrounding the coloring material becomes an acid type on a recording medium that exhibits slight acidity such as ordinary paper or the like, and it becomes difficult for the dispersant to be dissolved in water. Therefore, after printing, re-dissolution of the coloring material can be prevented, and in a case of multi-color printing, bleeding between inks can be prevented.

Further, as the polymeric dispersant, there can also be used poly styrene sulfonic acid, polyacrylic acid, polymethacrylic acid, polyvinylsulfonic acid, polyalginic acid, polyoxyethylene-polyoxypropylene-polyoxyethylene block copolymer, formalin condensate of naphthalenesulfonic acid, polyvinylpyrrolidone, polyethyleneimine, polyamines, polyamides, polyvinylimidazoline, aminoalkylacrylate-acrylamide copolymer, chitosan, polyoxyethylene fatty amide, polyvinylalcohol, polyacrylamide, cellulose derivatives such as carboxymethylcellulose, carboxyethylcellulose and the like, and polysaccharides and derivatives thereof.

The solubility parameter of the polymeric dispersant of the present invention is in the range from 10 or more to 13 or less. More preferably, it is in the range from 11 or more to 12.5 or less.

The solubility parameter of the dispersant is an index showing the hydrophilicity and the hydrophobicity, and when the solubility parameter of the dispersant is less than 10, the hydrophobicity is too strong and the dispersant itself cannot easily be dissolved in water, which is the main solvent. On the other hand, when the solubility parameter of the dispersant exceeds 13, the hydrophilicity is too high, adsorption to the pigment weakens, and dispersion becomes impossible.

The solubility parameter ($\delta$) in the present invention is a value calculated according to a calculation formula of Fedors described below, from the evaporation energy ($\Delta ei$) and the molar volume ($\Delta vi$) of an atom or an atomic group in a chemical structure. The solubility parameter of the dispersant is a value calculated in an unneutralized free acid state.

$$[\delta=(\Sigma\Delta ei/\Sigma\Delta vi)^{1/2}]$$ Calculation formula of Fedors In addition to calculating the solubility parameter from a chemical composition as described above, the solubility parameter can be obtained from measured values such as a calculation from the evaporation heat, a calculation from the refractive index, a calculation from the kauri-butanol value, a calculation from the surface tension, and the like.

The molecular weight in terms of the weight average of the polymeric dispersant in the present invention is preferably from 3,000 or more to 20,000 or less, and more preferably from 3,500 or more to 10,000 or less. When the weight average molecular weight is less than 3,000, dispersion stability, rub resistance of printing, and the optical density are liable to decrease. On the other hand, when the weight average molecular weight exceeds 20,000, an increase in dispersed particle size, and clogging of a nozzle are liable to occur.

The weight average molecular weight can be measured by a light scattering method, an X-ray small angle scattering method, a sedimentation equilibrium method, a diffusion method, anultracentrifugal method and by various chromatographies, and the weight average molecular weight in the present invention is a value in terms of a polyethylene glycol measured by a GPC (gel permeation chromatography) method.

The contained amount of the polymeric dispersant in the present invention is preferably in the range from 0.002% to 10% by weight, more preferably in the range from 0.003% to 8% by weight based on the total amount of the ink.

Further, the preferable pro portion of the polymeric dispersant in the present invention to the insoluble coloring material differs depending on the particle size, the specific surface area, the surface structure and the like of the pigment, but generally, it is necessary that the weight ratio of the pigment to the dispersant is in the range from 10:8 to 10:0.5. On the other hand, there is no need to use such a dispersant in cases in which a coloring material is used on whose surface an acidic group such as a carboxylic acid, a sulfonic acid or the like is directly placed, or in cases in which a coloring material is used to which has been applied treatment with a coupling agent such as an alcohol, an acid, a base, a silane compound or with the like, a polymer-grafting treatment, or a plasma treatment.

When the coloring material is dispersed using the dispersant, as combinations of the coloring material with the dispersant, the following for example can be favorably use; however, the combinations are not limited to those stated below.

TABLE 1

|  | Carbon black | Other coloring material |
|---|---|---|
| Polymeric dispersant |  |  |
| Hydrophobic group | Styrene<br>C1 to C8<br>Alkyl(meth)acrylic acid<br>Vinylnaphthalene | One corresponding to the polarity of a pigment surface is used |

TABLE 1-continued

| | Carbon black | Other coloring material |
|---|---|---|
| Hydrophilic group Acid · base interaction group | (Meth)acrylic acid Styrene sulfonic acid Dialkylamino(meth)acrylate Vinylpyridine | (Meth)acrylic acid Styrenesulfonic acid One corresponding to the polarity of the pigment surface is used |

As a method for producing the ink of the present invention, for example, a given amount of the coloring material is added to an aqueous solution containing a given amount of the dispersant, the mixture is sufficiently stirred, and thereafter the mixture is dispersed by using a dispersing machine; coarse particles are removed by centrifugal separation or the like, and thereafter, a given solvent, additives and the like are added, and the mixture is stirred, mixed and filtered so as to obtain the ink. In this case, it is also possible to use a method in which a concentrated dispersed solution of the coloring material is prepared which is diluted when preparing the ink. Further, providing a grinding process before the dispersion process is also possible. The dispersing machine may be any among commercially available machines. Examples thereof include a colloid mill, a flow jet mill, a slasher mill, a high speed disperser, a ball mill, an attriter, a sand mill, a sand grinder, an ultrafine mill, an Igar motor mill, a dinau mill, a pearl mill, an agitater mill, a cobol mill, a triple roller, a twin roller, an extruder, a kneader, a microfluidizer, a laboratory homogenizer, an ultrasonic wave homogenizer and the like, and these may be used alone or in combination. Alternatively, it is also possible to mix the given solvent, water and the dispersant, then add the coloring agent, and disperse the mixture using the dispersing machine. Further, to prevent admixture of inorganic impurities, it is preferable to use a dispersing method that dosen't use a dispersing medium; use of a microfluidizer, an ultrasonic homogenizer or the like is suitable in the present invention, dispersion was conducted with an ultrasonic wave homogenizer.

Further, in order to control the surface tension and wetting property of the dispersant and the ink, or as an additive for solubilizing the organic impurities, improving reliability in jetting, and the like, it is possible to use various surfactants. Examples of the surfactant include various anionic surfactants, non-ionic surfactants, cationic surfactants, ampholytic surfactants and the like.

As the anionic surfactant, alkylbenzenesulfonate salts, alkylphenylsulfonate salts, alkylnaphthalenesulfonate salts, higher fatty acid salts, sulfate ester salts of higher fatty ester, sulfonate salts of higher fatty ester, sulfate ester salts and sulfonate salts of higher alcohol ether, higher alkylsulfosuccinate salts, higher alkyl phosphate ester salts, phosphate ester salts of higher alcohol ethylene oxide adduct, and the like can be used; for example, dodecylbenzenesulfonate salt, chelylbenzenesulfonate salt, isopropylnaphthalenesulfonate salt, monobutylphenylphenol monosulfonate salt, monobutylbiphenyl sulfonate salt, monobutylbiphenylsulfonate salt, dibutylphenylphenol disulfonate salt, and the like are listed.

As the non-ionic surfactant, polypropylene glycol ethylene oxide adduct, polyoxyethylenenonylphenol ether, polyoxyethyleneoctylphenyl ether, polyoxyethylenedodecylphenyl ether, polyoxyethylene alkyl ether, polyoxyethylene fatty acid ester, sorbitan fatty acid ester, polyoxyethylene sorbitan fatty acid ester, fatty acid alkylol amide, acetylene glycol, oxyethylene adduct of acetylene glycol, aliphatic alkanol amide, glycerin ester, sorbitan ester and the like, for example, are listed as examples.

As the cationic surfactant, tetraalkyl ammonium salts, alkylamine salts, bezalconium salts, alkylpyridium salts, imidazolium salts and the like are listed as examples, for example, dihydroxyethylstearylamine, 2-heptadecenyl-hydroxyethylimidazoline, lauryldimethylbenzyl ammonium chloride, cetylpyridinium chloride, stearamide methylpyridinium chloride and the like are listed as examples.

In addition, there can also be used silicone-based surfactants such as polysiloxaneoxyethylene adduct and the like, fluorine-based surfactants such as perfluofoalkylcarboxylate salt, perfluofoalkylsulfonate salt, oxyethylene perfluoroalkyl ether and the like, and biosurfactants such as spicryspalic acid and rhamnolipid, lysolecithin and the like.

These surfactants may be used alone; alternatively, mixing together a plurality and then using the mixture is also possible. The amount added is preferably 5% by weight or less, and more preferably the amount used is in the range from 0.01 to 3% by weight. When the added amount exceeds 5% by weight, permeation of the ink into a recording material is accelerated, and image bleeding becomes serious.

As water-soluble organic solvents used in the ink for ink jet recording of the present invention, polyhydric alcohols and derivatives such as alkyl ethers thereof can be favorably used for preventing solidification of the ink. For example, polyhydric alcohols and polyhydric alcohol derivatives of alkyl ethers and the like such as glycerin, polyethylene glycol, polypropylene glycol, diethylene glycol, 2-(2-butoxyethoxy)ethanol, diethylene glycol phenyl ether, propylene glycol, propylene glycol monomethyl ether, butylene glycol, triethylene glycol, thiodiglycol, hexylene glycol, ethylene glycol methyl ether, diethylene glycol methyl ether, pentane diol, hexane triol, trimethylolpropane and the like can In addition, alcohols such as methyl alcohol, ethyl alcohol, n-propyl alcohol, isopropyl alcohol, n-butyl alcohol, hexyl alcohol, benzyl alcohol and the like, amides such as dimethylformamide, dimethylacetoamide and the like, ketones such as acetone, diacetone alcohol and the like, ketoalcohols, nitrogen-containing solvents having a high boiling point such as triethanolamine, diethanolamine, pyrrolidone, N-methyl-2-pyrrolidone,1,3-dimethyl-2-imidazolidinone and the like, sulfur-containing solvents such as dimethylsulfoxide, diethylsulfoxide, sulfolane, thiodiethanol and the like, saccharides and derivatives thereof such as glucose, maltose, amylose (dextran), cellulose sodium alginate, and the like, gum arabic and the like can be used.

The solvents above are only examples, and the solvents used in the present invention are not limited to them. Further, these may be used alone or in combinations of two or more.

As the water-soluble organic solvent, it is preferable to select more suitable solvents from among combinations of the water-insoluble coloring materials and the dispersants and the like. Further, the water-soluble organic solvents to be used may be used alone; alternatively, it is allowable to mix two kinds or more and use the mixture. The water-soluble organic solvent is contained in an amount from 1 to 60% by weight of the ink, preferably from 5 to 40% by weight of the ink.

Further, in a system in which a coloring material is dispersed using a dispersant, using a solvent having a solubility parameter greater than or equal to 0.5 less than the solubility parameter of the aforementioned polymeric dispersant as the water-soluble organic solvent, the contained amount of the water-soluble organic solvent having a solubility parameter within or equal to ±0.5 of the solubility parameter of the aforementioned polymeric dispersant being 5% by weight or less based on the total weight of the ink, and the contained amount of the water-soluble organic solvent having a solubility parameter exceeding 0.5 more than the solubility parameter of the aforementioned polymeric dispersant being 1 to 30% by weight based on the total weight of the ink, is preferable. By combining the aforementioned water-insoluble coloring material and the aforementioned polymeric dispersant with a water-soluble organic solvent having these conditions, it becomes possible to obtain the ink which generates no printing unevenness and has excellent rub resistance from during the initial period to after storage for a long period of time.

A solvent having a solubility parameter greater than or equal to 0.5 less than the solubility parameter of the aforementioned polymeric dispersant is used as the water-soluble organic solvent, since if the solubility parameter of the solvent used is less than 0.5 subtracted from the solubility parameter of the aforementioned polymeric dispersant, adsorption of the water-soluble organic solvent to the pigment, more than the decrease in the solubility of the aforementioned polymeric dispersant, becomes problematic. Namely, when the solubility parameter is lower than that of the dispersant, the water-soluble organic solvent, instead of the dispersant, adsorbs to the pigment. As a result, the pigment cannot be dispersed and flocculates. This phenomenon progresses particularly under stress conditions at high temperatures. Therefore, the solubility parameter of the solvent is preferably greater than the solubility parameter of the polymeric dispersant, and at the very least, having a solubility parameter greater than or equal to 0.5 less than the solubility parameter of the polymeric dispersant is necessary.

Here, the solubility parameter of the water-soluble organic solvent of the present invention is a value which was calculated, like the solubility parameter of the polymeric dispersant, with the calculation formula of Fedors and with the evaporation energy and the molar volume of an atom or an atomic group of the aforementioned chemical structure.

The contained amount of the water-soluble organic solvent having a solubility parameter within or equal to ±0.5 of the solubility parameter of the aforementioned polymeric dispersant is 5% by weight or less based on the total weight of the ink, since though the solubility parameter of the solvent is preferably higher than the solubility parameter of the polymeric dispersant, when the amount of the solvent is extremely small, the effect is small; if the contained amount is over 5% by weight, a reversal phenomenon occurs such that the water-soluble organic solvent instead of the polymeric dispersant adsorbs to the pigment, and the like, and the coloring material flocculates during storage at high temperatures.

The contained amount of the water-soluble organic solvent having a solubility parameter exceeding 0.5 greater than the solubility parameter of the aforementioned polymeric dispersant is from 1 to 30% by weight based on the total weight of the ink, since when the contained amount is less than 1% by weight, moisture retention action, permeating action and particle size controlling action tend to become insufficient, and when exceeding 30% by weight, thickening property increases and image deterioration is liable to occur.

As for the water used in the present invention, purified water such as deionized water, ultrapure water, distilled water, ultrafiltrated water and the like, are preferable since they have no admixture of impurities.

In addition, to control ink properties, polyethyleneimine, polyamines, polyvinylpyrrolidone, poly ethylene glycol, cellulose derivatives such as ethylcellulose, carboxymethylcellulose and the like, polysaccharides and derivatives thereof, other water-soluble polymers, polymer emulsions such as acrylic polymer emulsion, polyurethane-based emulsion and the like, cyclodextrin, macrocyclic amines, dendrimer, crown ethers, urea and other derivatives, acetoamide and the like can be used.

Further, to control the conductivity and the pH, compounds of alkaline metals such as potassium hydroxide, sodium hydroxide, lithium hydroxide and the like, nitrogen-containing compounds such as ammonium hydroxide, triethanolamine, diethanolamine, ethanolamine, 2-amino-2-methyl-1-propanol and the like, compounds of alkaline earth metals such as potassium hydroxide, acids such as sulfuric acid, hydrochloric acid, nitric acid and the like, salts of a strong acid and a weak alkali such as ammonium sulfate and the like, can be used.

In addition, pH buffering agents, antioxidants, antifungal agents, thickness regulators, electroconductive agents, ultraviolet absorbers, and chelating agents, and further, water-soluble dyes, dispersing dyes, oil-soluble dyes and the like can be added as needed.

The range of the pH of the ink jet recording liquid is from 3 to 11, preferably from 4.5 to 9.5; however, the pH is not limited this range. Further, in an ink jet recording liquid having an anionic ionized group on the surface of the coloring material, the ink jet recording liquid is used having a pH from 6 to 10, preferably a pH from 6 to 9.5, and more preferably a pH from 7.5 to 9.0. On the other hand, in an ink jet recording liquid having a cationic ionized group on the surface of the coloring material, the ink jet recording liquid is used having a pH from 4.5 to 8, preferably a pH from 4.5 to 7.0.

The ink of the present invention can of course be used in an ordinary ink jet recording apparatus, and can also be used in a recording apparatus mounted with a heater and the like for helping to fix the ink onto paper, and in a recording apparatus which is mounted with an intermediate transferring mechanism and which, after printing the ink on an intermediate material, transfers the printed ink to a recording material such as paper and the like.

Next, each of the conditions characterizing the ink jet recording liquid of the present invention will be explained.

First, basic principles of zeta potential will be indicated below. In general, in a system in which a solid is dispersed in a liquid, when a surface of a solid phase has a electric charge, a charged layer of opposite charge appears in a liquid phase in the vicinity of a solid phase so as to maintain electrical neutrality. This is called an electric double layer, and the electric potential which depends on this electric double layer is called the zeta potential. As methods for measuring this zeta potential, several methods are known; for example, there are: a measuring method by electrophoresis, Electrokinetic Sonic Amplitude method (ESA method), Utrasonic vibration Potential method (UVP method) and the like. In the present invention, the zeta potential is measured using the ESA method by which measurement can be conducted without diluting a concentrated solution such as the aqueous ink jet recording liquid. A measuring theory of this ESA method is something like the following. Namely, when alternating electric fields are applied to a dispersed solution, dispersed materials electrophoretically move by these alternating electric fields. By measuring voltage generated from this electrophoresis by using a piezoelectric element, the zeta potential can be calculated according to the following formula.

$$\text{Zeta potential} = ESA \cdot \eta \cdot G(\alpha)^{-1} / \epsilon \cdot c \cdot \Delta\rho \cdot V \qquad \text{[Example 1]}$$

Here, ESA is a value obtained by measurement, and indicates the pressure per unit electric field. η represents the viscosity of the solvent, $G(\alpha)^{-1}$ represents the correction factor of an operation of the force of inertia, ε represents the dielectric constant of the solvent, c represents the speed of sound in the solvent, Δρ represents the density difference between the solvent and particles, and V represents the volume proportion of the particles.

An investigation of the above-described parameters has been carried out, and since it has been judged that the viscosity of the ink can be used for η, the dielectric constant of water for ε, the density difference between the coloring material and water for Δρ, and the volume proportion of the coloring material for V, it has been decided to determine the zeta potential by using these parameters in the present invention. To measure the zeta potential, ESA-8000 (manufactured by Matec Applied Science Co.) is used as a measuring apparatus, and a measuring cell is filled with 400 ml of the aqueous ink jet recording liquid, and measurement was carried out in accordance with a given measuring method in a state in which a measuring probe was immersed in a prescribed amount.

It has been found that in cases in which the absolute value of the zeta potential o f the ink measured as described above is 20 mV or more, there is exhibited characteristics of excellence in dispersion stability and printing quality. On the other hand, in cases in which the absolute value of the zeta potential is less than 20 mV, printing qualities such as storage stability of the recording liquid over long periods of time and rub resistance of image and the like are poor. By this, it is considered that in cases in which the absolute value of the zeta potential is over 20 mV, it is possible to suppress flocculation between dispersed particles through electrostatic repulsion acting between the dispersed particles; however, in cases in which the zeta potential is less than 20 mv, electrostatic repulsion able to suppress flocculation cannot be obtained. Preferably, the absolute value of the zeta potential is from 20 mV or more to 50 mV or less. The reason for this is that in regards to an ink having an absolute value of the zeta potential of over 50 mV, there were cases in which image bleeding occurred and optical density decreased; this is believed to occur due to not being able to obtain suitable flocculation of the coloring material on the recording material. Further, an absolute value of zeta potential of 20 mv or more includes a zeta potential of −20 mv or less when it is negative.

Since the zeta potential is controlled by various factors such as the dispersant for dispersing the water-insoluble coloring agent and the water-insoluble coloring material, the aqueous organic solvent added, electrolytes present in the ink and the like, regulation of the zeta potential is not determined by only one method; however, when a certain water-insoluble coloring material, a certain polymeric dispersant and electrolytes present in the ink are examined as models, for example, the hydrophobic group of the polymeric dispersant is found to be adsorbing to the surface of the water-insoluble coloring material. The adsorption strength depends on surface characteristics of the water-insoluble coloring material and on the interaction between molecules of the polymeric dispersant, i.e., mainly on the surface characteristics of the water-insoluble coloring material and on the nature of the hydrophobic group of the polymeric dispersant. If the adsorption strength between them is sufficiently high, a sufficient number of the molecules of the polymeric dispersant would cover the surface of the water-insoluble coloring material. Further, due to the hydrophilic group of the polymeric dispersant existing in a form that forms an outermost shell of the water-insoluble coloring material, the water-insoluble coloring material is coated with electric charge. Therefore, if the number of the hydrophilic groups existing on the surface of the water-insoluble coloring material is high and the dissociation degree of the hydrophilic groups increases, the surface electric charge density of the water-insoluble coloring material increases and the zeta potential also increases. Further, the dissociation degree of the hydrophilic group of the polymeric dispersant, since it is determined by the concentration of the electrolytes in the aqueous medium, can be controlled by using the conductivity and the pH as indices.

On the other hand, in cases in which the concentration of the electrolytes present in the aqueous medium is too high, the electric charge on the surface of the water-insoluble coloring material is completely compensated for electrically by the electrolytes in the aqueous medium, and the zeta potential decreases.

Therefore, regulation of the zeta potential is conducted while sufficiently considering factors such as those described above, such as adsorption strength between the water-insoluble coloring material and the polymeric dispersant, the concentration of the electrolytes present in the aqueous medium, and the like.

Further, in cases in which the conductivity is in the range from 0.05 S/m to 0.75 S/m, characteristics such as those indicated in the effect of the present invention were obtained. In cases in which the conductivity was less than 0.05 S/m, the result was that storage stability over long periods of time and image-fixing property deteriorated. It is considered that this is caused by the dissociation of ionized groups on the surface of the coloring material not being fully effected. On the other hand, in cases in which the conductivity exceeded 0.75 S/m, as well, the result was that storage stability over long periods of time and image-fixing property deteriorated. It is considered that this is caused by the fact that, though ionized groups on the surface of the coloring material are dissociated, there are a lot of electrolytes present in the liquid phase, and therefore, the electric double layer is compressed, and repulsion between the particles weakens.

The conductivity is preferably in the range from 0.10 S/m or more to 0.50 S/m or less, and more preferably in the range from 0.10 S/m or more to 0.35 S/m or less. In the present invention, a conductivity tester AOL-40-3302 (manufactured by DKK Corp.) was used as a measuring apparatus. 50 ml of the aqueous ink jet recording liquid was charged into a measuring vessel, a measuring probe was immersed in a prescribed amount, and measurement was conducted according to a given measuring method.

The conductivity is determined by the amount of the electrolytes dissolved in the aqueous medium, namely, the amount of the electrolytes such as alkaline metal salts and the like to be added, and the amount of the electrolytes contained in the water-insoluble coloring material and the polymeric dispersant and the like; therefore, the conductivity is regulated while sufficiently taking these factors into consideration.

It has been found that the number average particle size of the dispersed particles is from 15 to 200 nm, and in a case in which the number of particles having a particle size of 0.5 μm or more present in one liter is $2.5 \times 10^{11}$ or less, dispersion stability and printing quality of the ink are excellent. When the number average particle size of the dispersed coloring material was less than 15 nm, there were cases in which pollution of the ink flow route inner portion instead increased, and cases in which reparability of nozzle clogging deteriorated also occurred. Further, in cases in which the number average particle size of the dispersed coloring material was greater than 200 nm, the coloring material precipitated and flocculated due to the difference in density between the solution and the coloring material, and not only did characteristics such as storage stability over long periods of time, nozzle clogging, kogation and the like deteriorate, but image-fixing property was also poor since the coloring material could not form a suitable flocculated structure on the recording material.

On the other hand, in cases in which the number of particles having a particle size of 0.5 $\mu$m or more present in one liter was over $2.5 \times 10^{11}$, it is considered that the probability of collision among the coloring materials increases and flocculation speed of the coloring material is accelerated; characteristics such as storage stability over long periods of time, nozzle clogging, kogation and the like were poor.

The number average particle size of the dispersed coloring material is preferably from 20 to 150 nm, more preferably from 20 to 80 nm. Further, the number of particles having a particle size of 0.5 $\mu$m or more in one liter is preferably $5 \times 10^{10}$ or less, and more preferably $2.5 \times 10^{10}$ or less.

The volume average particle size of the dispersed particles is preferably from 30 to 250 nm. In cases in which the volume average particle size of the dispersed particles was over 250 nm, characteristics such as storage stability over long periods of time, nozzle clogging, and kogation and the like were poor, and when less than 30 nm, kogation and recoverability property of nozzle clogging were poor.

The range in the volume average particle size of the dispersed particles is more preferably from 30 to 200 nm, and even more preferably from 50 to 150 nm.

In the present invention, in order to control the particle size, namely, in order to control the number average particle size or the volume average particle size, as well as the number of particles having a particle size of 0.5 or more present in one liter, the desired particle size conditions are attained through the following: selection of the particle size of the water-insoluble coloring material particles used, a preparatory grinding process of the water-insoluble coloring material, a grinding method thereof, selection of the polymeric dispersant and the dispersing machine or the like used when preparing a dispersed liquid of the water-insoluble coloring material particles using the polymeric dispersant, and suitable selection of dispersion conditions such as dispersion time and the like, of conditions of a centrifugal separation process and the like, and of conditions of a filtering process and the like.

In the present invention, as a measuring apparatus of the number average particle size and the volume average particle size, a Microtrac UPA particle size analyzer 9340 (manufactured by Leeds & Northrup Co.) was used. 4 ml of the ink jet recording liquid was charged into a measuring cell, and measurement was conducted according to a given measuring method. As parameters to be input when measuring, the viscosity of the ink is used for the viscosity, and the density of the coloring material is used for the density of the dispersed particles. This apparatus is an apparatus that utilizes Brownian motion of the dispersed materials to measure the particle size, and measures the particle size by irradiating a solution with a laser light, and detecting the scattered light thereof.

In the present invention, as for the number of particles having a particle size of 0.5 $\mu$m or more an Accusizer™ 770 Optical Particle Sizer (manufactured by Particle Sizing Systems Inc.) was used as a measuring apparatus. As for this measurement, it was carried out by weighing 2 $\mu$l of the aqueous ink jet recording liquid, charging the liquid into a measuring cell, and following a given measuring method. Further, as a parameter to be input when measuring, the density of the coloring material is used for the density of the dispersed particles. This measuring apparatus detects particles passing a measuring part by using an optical method.

Particularly, for an ink jet recording liquid containing a pigment having as a ionized group an acidic group on its surface, it is preferable to control the pH by a compound of alkaline metals. It is thought that the reason for this is that the compound of alkaline metals is a strong electrolyte, and has a large strong effect in liberating the ionized group on the surface of the pigment.

The ion concentration of an alkaline metal ion is preferably from 500 to 3000 ppm. In cases in which the ion concentration of the alkaline metal was less than 500 ppm, nozzle clogging and kogation occurred. This is thought to occur because the acidic group on the surface of the pigment is not fully dissociated. In cases in which the ion was present in a concentration of over 3000 ppm, storage stability over long periods of time, kogation and image-fixing property was poor. It is thought that the reason for this is that, owing to excessive presence of the electrolytes in the liquid phase, electrostatic repulsion potential between surfaces of the pigments decreases, and dispersion stability of the pigment decreases.

More preferably, the alkaline metal ion concentration is from 500 ppm to 2500 ppm, and further preferably in the range from 1000 ppm to 2000 ppm.

Further, though inorganic materials such as Si, Fe, Ca and the like tend to be mixed in as impurities by being contained in the coloring material and the like, in general, it is advantageous that the amount of polyvalent inorganic materials is small irrespective of cation, nonion and anion, and the concentrations of Si, Fe and Ca are preferably 20 ppm or less, respectively. The reason for this is that, the electric double layer formed by the electric charge on the surface of the coloring material is reduced, electrostatic repulsion among the coloring materials lowers, and flocculation of the coloring material occurs.

Further, the viscosity of the recording liquid is preferably from 1.5 to 10 mPa·s.

The ink jet recording method of the present invention is not particularly restricted provided the ink for the ink jet recording of the present invention is used as the ink, and there can be adopted a recording method known per se. The above-described ink jet recording method is generally a method in which ink liquid drops discharged through an orifice according to a recording signal are allowed to permeate the recording medium.

The recording method used for the ink jet recording method of the present invention is not particularly restricted, and there are listed as examples, an electric charge controlling method in which the ink is discharged by utilizing electrostatic attractive force, a so-called drop on demand method (a pressure pulse method) in which the ink is discharged by utilizing vibration pressure of a piezo element, a so-called thermal ink jet method in which the ink liquid drops are formed by utilizing pressure generated by formation and growth of bubbles obtained by heating the ink, and the like, for example.

In the present invention, the thermal ink jet method is preferable among these recording methods. When the ink liquid drops are formed by allowing thermal energy from a heating means to act on the ink for ink jet recording, discharging stability is excellent.

Below, a favorable example of the ink jet recording method of the present invention using the thermal ink jet method will be explained while referring to FIGS. 1 to 3.

Figure 2:
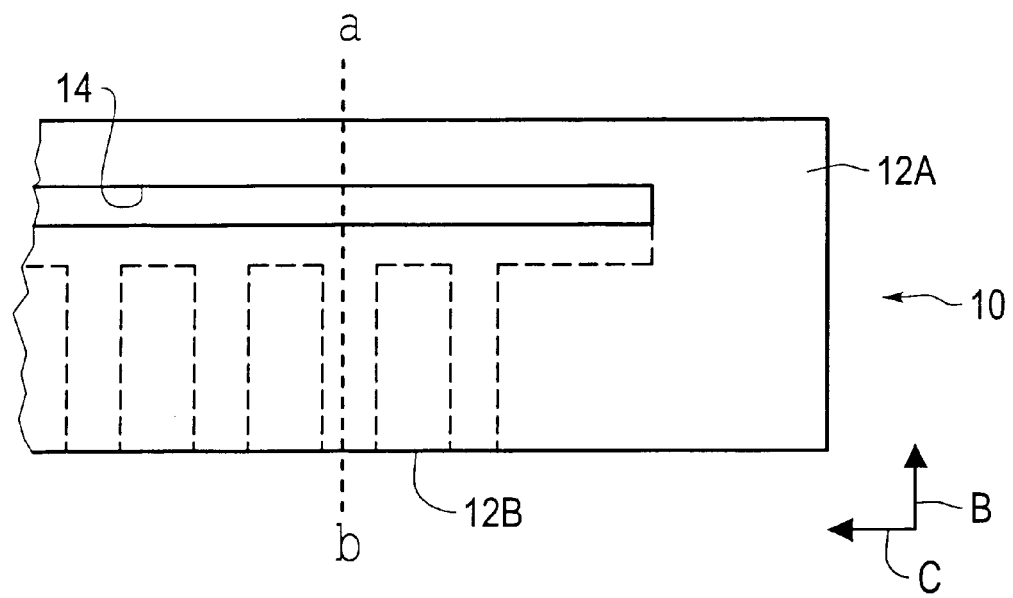
FIG. 2 is a plan view illustrating the example of the recording head used in the ink jet recording apparatus using the thermal ink jet method.
Figure 3:
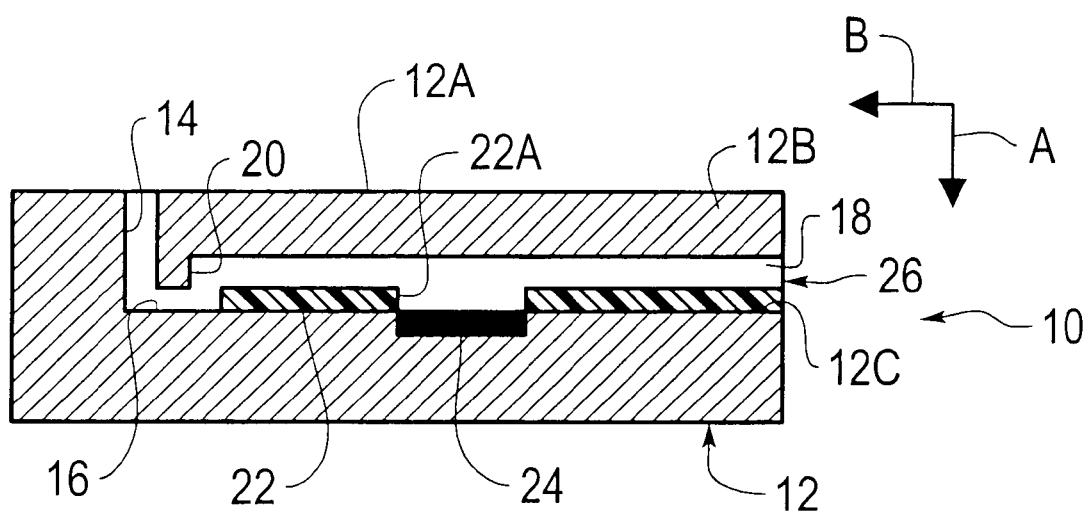
FIG. 3 is the example of the recording head used in the ink jet recording apparatus using the thermal ink jet method, and is a cross-sectional view cut along a dotted line ab (the depth direction) of the recording head shown in FIGS. 1 and 2.

FIGS. 1 to 3 are schematic views of a recording head used in the thermal ink jet method. FIG. 1 is a front view of the recording head, FIG. 2 is a plan view of the recording head, and FIG. 3 is a cross-sectional view of the recording head along a dotted line ab in FIGS. 1 and 2. In FIG. 1, the direction of an arrow A indicates the height direction of the recording head, the direction of an arrow B indicates the depth direction of the recording head, and direction an arrow C indicates the length direction of the recording head, respectively.

A recording head 10 provides a body 12 which is in a form of a rectangular parallelopiped formed with silicon. At this body 12, a primary flow route 14 is formed which is parallel to the height direction (the arrow A direction), and which reaches approximately the center of the height direction from an upper surface 12A to the body 12.

At the body 12 a cut-out 12C is formed in a form of a rectangular parallelopiped which is parallel to the depth direction (the arrow B direction) and which from a surface 12B reaches the area before the primary flow route 14; at the depth direction side of the cut-out 12C, a connecting route 16 is formed which is parallel to the depth direction (the arrow B direction) and which connects the cut-out 12C with the primary flow route 14.

Further, at the body 12 at a position continuous with the cut-out 12C and parallel to the depth direction (the arrow B direction), secondary flow routes 18 are formed. The form of the front faces of these secondary flow routes 18 is triangular, and the length in the depth direction of the secondary flow routes 18 is set slightly shorter than the length in the depth direction of the cut-out 12C.

Further, at the body 12 a connecting route 20 is formed which is parallel to the height direction (the arrow A direction) and which connects the front face of the connecting route 16 (the 12C side) and the side of the secondary flow route 18 that is opposite from the front face (the 12C side) of the secondary flow route 18.

An insertion portion 22 in a form of a rectangular parallelopiped made with a polyimide resin is inserted at the cut-out 12C, and fixed with an epoxy resin. At this insertion portion 22, a cut-out 22A in the form of a rectangular parallelopiped is formed at a position that is below the secondary flow route 18 and is approximately at the center of the insertion portion 22 in the depth direction; at the cut-out 22A, a heating element 24 which is connected to a controller not shown in the drawing is placed as a heating means. Namely, in this recording head 10, the surrounding part of the heating element 24 used as a heating means is made from a polyimide-based resin. When the surrounding part of the heating means is made from a polyimide-based resin as described above, since this resin has sufficient chemical resistance in regards to components contained in the ink for ink jet recording, deterioration of the surrounding part of the heating means can be suppressed.

"Surrounding part of the heating means" indicates a portion that is heated to 200° C. or higher by a heating element and which contacts an ink flow route.

In this recording head 10, the primary flow route 14, the connecting routes 16 and 20 and the secondary flow route 18 form an ink flow route, and the front 12B side of the secondary flow route 18 is a discharging outlet 26. Ink flowing through the ink flow route is heated by the heating element 24 disposed at the lower part of the secondary flow route 18, and by this, ink liquid drops are formed and discharged from the discharging outlet 26.

Heating of the heating element 24 is conducted by operating (applying) a plurality of energy pulses from the controller, which is not shown in the drawing, according to recording signals. When the recording head receives the operation of the plurality of energy pulses, initial printing quality can be maintained, even after use over long periods of time.

Further, the ink jet recording method of the present invention may contain other processes in addition to a recording process for effecting recording; for example, for the purpose of preventing clogging, the recording method preferably contains a process of preparing to discharge the ink liquid drops while recording is not being conducted by applying recovery pulses to the heater at such a level that the ink is not discharged. Further, for the purpose of promoting print fixing, the recording method preferably contains a heating process for heating the recording paper and the ink during printing or before and after printing.

Further, the ink jet recording method of the present invention is used as a method for directly printing on a recording medium such as ordinary paper, glossy paper, special paper, cloth, film, OHP transparencies and the like, and in addition, the ink jet recording method may also be used as a method in which printing is effected on an intermediate drum, a belt or the like, an ink image is arranged on the intermediate, then, transferring recording is effected on a recording medium such as forms, cloth, film or the like.

On the recording material, dispersion stability of the coloring material in the ink decreases due to evaporation of water, the water-soluble organic solvent and the like. In this case, when flocculation of the coloring material is too fast, it is considered that though characteristics such as prevention of image bleeding, high optical concentration and the like are excellent, image-fixing property is poor. On the contrary, in cases in which dispersion of the coloring material is stable and the coloring does not flocculate even on the recording material, it is considered that though image-fixing property is excellent, image bleeding and optical density are poor. Therefore, to satisfy all of the printing characteristics of image bleeding, optical density, rub resistance and the like, it is necessary that the coloring material forms a suitable flocculated structure on the recording material. It is considered that the aqueous ink jet recording liquid prepared in accordance with the present invention has excellent printing characteristics such as image bleeding, optical density, rub resistance and the like, and the coloring material suitably flocculates on the recording material.

EXAMPLES

The following examples illustrate the present invention in detail.

Washing of a water-insoluble coloring material, preparation of a dispersed liquid of a water-insoluble coloring material, and preparation of an aqueous ink jet recording liquid in the following examples were conducted in accordance with the following methods.

Washing Method of Water-insoluble Coloring Material

To 30 parts by w eight of a water-insoluble coloring material were added 210 parts by weight of deionized water, and ultrasonic waves were applied for 10 minutes. The resulting mixture was subjected to centrifugal separation by a centrifugal separator, to remove a supernatant. The water-insoluble coloring material was washed by repeating this procedure.

Preparation Method 1 of Water-insoluble Coloring Material Dispersion

To 30 parts by weight of a water-insoluble coloring material were added 3 to 9 parts by weight of a polymeric dispersant (examples: an alkaline metal neutralized salt of styrene-methacrylic acid copolymer, an alkaline metal neutralized salt of styrene-styrenesulfonic acid copolymer, and the like); further, to this was added deionized water to obtain a total amount of 300 parts by weight. This liquid was dispersed using an ultrasonic homogenizer. This liquid was subjected to centrifugal separation with a centrifugal separator, to remove 100 parts by weight of a residual portion. The supernatant was passed through a filter of 1 μm, to obtain a dispersion of the water-insoluble coloring material.

Preparation Method 2 of Water-insoluble Coloring Material Dispersion

The same procedure as in the preparation method 1 was conducted except that a dispersing apparatus was changed from the ultrasonic homogenizer to a glass bead/ball mill dispersion, to obtain a dispersion of the water-insoluble coloring material.

Preparation Method 3 of Water-insoluble Coloring Material Dispersion

The same procedure as in the preparation method 2 was conducted except that a dispersing apparatus to which steel roll grinding had been applied was used, to obtain a dispersion of the water-insoluble coloring material.

Preparation Method of Aqueous Ink Jet Recording Liquid

To a dispersion of a water-insoluble coloring material were added an aqueous organic solvent, deionized water, a pH regulator (sodium hydroxide and the like) and a surfactant; the mixture was regulated so that the total amount was 100 parts by weight and the concentration of the water-insoluble coloring material had a given value; this was mixed, stirred, and passed through a filter of 1 μm, to obtain the intended ink.

Further, in the following examples, a trade name of a water-insoluble coloring material which has been washed previously using the above-described washing method is followed by an expression "/washed". Unless otherwise stated, preparation of the aqueous ink jet recording liquid was conducted by the above described [Preparation method of aqueous ink jet recording liquid].

Example 1

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-methacrylic acid-sodium methacrylate copolymer (formulating ratio: 33/67, Na salt 95% neutralized, SP value: 11.7, weight average molecular weight: 7000) | 0.5 parts by weight |
| Glycerin (SP value: 20.2) | 15 parts by weight |
| Surfactant (Pluronic PE6400/manufactured by BASF Corp.) | 0.03 parts by weight |
| Isopropyl alcohol (SP value: 11.6) | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid had a zeta potential of −30.3 mV, a conductivity of 0.12 S/m, a number average particle size of 30.5 nm, a number of particles having a particle size of 0.5 μm or more present in one liter of $8.2 \times 10^9$, a volume average particle size of 62.5 nm, a viscosity of 2.9 mPa·s, a surface tension of 45 mN/m, a pH of 8.9, a Si concentration of 4 ppm, a Fe concentration of 1 ppm, and a Ca concentration of 4 ppm.

Example 2

An aqueous ink jet recording liquid having a composition shown below was obtained using the preparation method 1 of water-insoluble coloring material dispersion.

| | |
|---|---|
| Carbon black (Raven 1080/manufactured by Columbian Carbon Co., Ltd./no washing) | 5 parts by weight |
| styrene-styrenesulfonic acid-sodium styrenesulfonate copolymer (formulating ratio: 50/50, Na salt 95% neutralized, SP value: 11.0, weight average molecular weight: 8000) | 0.5 parts by weight |
| Ethylene glycol (SP value: 17.8) | 15 parts by weight |
| Surfactant (Pluronic PE6400/manufactured by BASF Co.) | 0.03 parts by weight |
| Isopropyl alcohol (SP value: 11.6) | 3 parts by weight |
| Urea | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

Carbon black in which the amount of inorganic impurities contained was small was used, and the recording liquid was prepared without carrying out washing of carbon black. Further, this recording liquid had a zeta potential of −36.2 mV, a conductivity of 0.16 S/m, a number average particle size of 63.1 nm, a number of particles having a particle size of 0.5 μm or more present in one liter of $2.1 \times 10^{10}$, a volume average particle size of 131.4 nm, a viscosity of 2.6 mPa·s, a surface tension of 46 mN/m, a pH of 8.9, a Si concentration of 3 ppm, a Fe concentration of 1 ppm, and a Ca concentration of 3 ppm.

Example 3

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./no washing) | 5 parts by weight |
| Styrene-methacrylic acid-sodium mecharylate copolymer (formulating ratio: 33/67, Na salt 95% neutralized, SP value: 11.7, weight average molecular weight: 7000) | 0.5 parts by weight |
| Glycerin (SP value: 20.2) | 15 parts by weight |

-continued

| | |
|---|---|
| Surfactant (Pluronic PE6400/manufactured by BASF Co.) | 0.03 parts by weight |
| Isopropyl alcohol (SP value: 11.6) | 3 parts by weight |
| Sodium hydroxide | (note) |
| Deionized water | remainder |
| Total: | 100 parts by weight |

(Note) Sodium hydroxide was added so that the pH of the ink ultimately obtained was 8.8.

A comparison with Example 1 was conducted by using unwashed carbon black, and the recording liquid was prepared so that the content of Ca as an inorganic impurity was high. This recording liquid had a zeta potential of −22.5 mV, a conductivity of 0.23 S/m, a number average particle size of 38.4 nm, a number of particles having a particle size of 0.5 μm or more present in one liter of $4.3 \times 10^{10}$, a volume average particle size of 83.9 nm, a viscosity of 2.9 mPa·s, a surface tension of 44 mN/m, a pH of 8.8, a Si concentration of 5 ppm, a Fe concentration of 2 ppm, and a Ca concentration of 22 ppm.

Example 4

An aqueous ink jet recording liquid having a composition shown below was obtained using the preparation method 2 of water-insoluble coloring material dispersion.

| | |
|---|---|
| Carbon black (Black Pearls L/manufactured by Cabot Corp./washed) | 5 parts by weight |
| Styrene-methacrylic acid-sodium mecharylate copolymer (formulating ratio: 33/67, Na salt 95% neutralized, SP value: 11.7, weight average molecular weight: 7000) | 0.5 parts by weight |
| Glycerin (SP value: 20.2) | 15 parts by weight |
| Surfactant (Pluronic PE6400/manufactured by BASF Co.) | 0.03 parts by weight |
| Isopropyl alcohol (SP value: 11.6) | 3 parts by weight |
| Urea | 3 parts by weight |
| Potassium hydroxide | (note) |
| Deionized water | remainder |
| Total: | 100 parts by weight |

(Note) Potassium hydroxide was added so that the pH of the ink ultimately obtained was 8.9.

This recording liquid was prepared so that the contained amount of Si as an inorganic impurity was high by carrying out glass bead/ball mill dispersion as the dispersing method. Further, this recording liquid had a zeta potential of −26.5 mV, a conductivity of 0.21 S/m, a number average particle size of 42.2 nm, a number of particles having a particle size of 0.5 μm or more present in one liter of $5.2 \times 10^{10}$, a volume average particle size of 93.3 nm, a viscosity of 2.8 mPa·s, a surface tension of 45 mN/m, a pH of 8.9, a Si concentration of 23 ppm, a Fe concentration of 1 ppm, and a Ca concentration of 4 ppm.

Example 5

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./no washed) | 5 parts by weight |
| Styrene-acrylic acid-potassium acrylate copolymer (formulating ratio: 33/67, Na salt 95% neutralized, SP value: 12.4, weight average molecular weight: 12000) | 1.0 parts by weight |
| Glycerin (SP value: 20.2) | 15 parts by weight |
| Surfactant (Pluronic PE6400/manufactured by BASF Co.) | 0.03 parts by weight |
| Isopropyl alcohol (SP value: 11.6) | 3 parts by weight |
| Urea | 3 parts by weight |
| Potassium hydroxide | (note) |
| Deionized water | remainder |
| Total: | 100 parts by weight |

(Note) Potassium hydroxide was added so that the pH of the ink ultimately obtained was 8.1.

This recording liquid was prepared so that the contained amount of Fe as an inorganic impurity was high in comparison with Example 1, by applying a steel roll grinding process to carbon black. Further, this recording liquid had a zeta potential of −20.3 mV, a conductivity of 0.34 S/m, number average particle size of 40.1 nm, a number of particles having a particle size of 0.5 μm or more present in one liter of $5.1 \times 10^{10}$, a volume average particle size of 88.7 nm, a viscosity of 2.9 mPa·s, a surface tension of 46 mN/m, a pH of 8.1, a Si concentration of 4 ppm, a Fe concentration of 25 ppm, and a Ca concentration of 4 ppm.

Comparative Example 1

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-methacrylic acid-sodium methacrylate copolymer (formulating ratio: 33/67, Na salt 95% neutralized, SP value: 11.7, weight average molecular weight: 7000) | 0.5 parts by weight |
| Glycerin (SP value: 20.2) | 15 parts by weight |
| Surfactant (Pluronic PE6400/manufactured by BASF Co.) | 0.03 parts by weight |
| Isopropyl alcohol (SP value: 11.6) | 3 parts by weight |
| Sodium hydroxide | (note) |
| Deionized water | remainder |
| Total: | 100 parts by weight |

(Note) Sodium hydroxide was added so that the pH of the ink ultimately obtained was 7.5.

This recording liquid was prepared so that the pH was low by reducing the amount of sodium hydroxide. Further, this recording liquid had a zeta potential of −12.7 mV, a conductivity of 0.07 S/m, a number average particle size of 82.6 nm, a number of particles having a particle size of 0.5 μm or more present in one liter of $2.9 \times 10^{11}$, a volume average particle size of 211.2 nm, a viscosity of 2.9 mPa·s, a surface tension of 46 mN/m, a pH of 7.5, a Si concentration of 4 ppm, a Fe concentration of 1 ppm, and a Ca concentration of 4 ppm.

Comparative Example 2

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-methacrylic acid-sodium methacrylate copolymer (formulating ratio: 33/67, Na salt 95% neutralized, SP value: 11.7, weight average molecular weight: 7000) | 0.5 parts by weight |
| Glycerin (SP value: 20.2) | 15 parts by weight |
| Sodium hydroxide | (note) |
| pH buffer (N,N-Bis(2-hydroxyethyl)-2-aminoethasulfonic acid) | 3 parts by weight |
| Surfactant (Pluronic PE6400/manufactured by BASF Co.) | 0.03 parts by weight |
| Isopropyl alcohol (SP value: 11.6) | 3 parts by weight |
| Urea | 3 parts by weight |
| Deionized water | remainder |
| Total: | 100 parts by weight |

(Note) Sodium hydroxide was added so that the pH of the ink ultimately obtained was 8.9.

This recording liquid was prepared so that the pH was of the same level as in Example 1 the conductivity was high, by increasing the amount of sodium hydroxide and adding the pH buffer. Further, this recording liquid had a zeta potential of −9.3 mV, a conductivity of 0.77 S/m, a number average particle size of 43.2 nm, a number of particles having a particle size of 0.5 $\mu$m or more present in one liter of $5.5 \times 10^{10}$, a volume average particle size of 87.3 nm, a viscosity of 3.0 mPa·s, a surface tension of 45 mN/m, a pH of 8.9, a Si concentration of 3 ppm, a Fe concentration of 1 ppm, and a Ca concentration of 4 ppm.

Comparative Example 3

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-methacrylic acid-sodium methacrylate copolymer (formulating ratio: 33/67, Na salt 95% neutralized, SP value: 11.7, weight average molecular weight: 7000) | 0.2 parts by weight |
| Polyoxyethylenenonylphenyl ether (SP value: 9.7, weight average molecular weight: 660) | 0.3 parts by weight |
| Glycerin (sp value: 20.2) | 15 parts by weight |
| Surfactant (Pluronic PE6400/manufactured by BASF Co.) | 0.03 parts by weight |
| Isopropyl alcohol (SP value: 11.6) | 3 parts by weight |
| Sodium hydroxide | (note) |
| Deionized water | remainder |
| Total: | 100 parts by weight |

(Note) Sodium hydroxide was added so that the pH of the ink ultimately obtained was 9.0.

This recording liquid was prepared so that the pH was of the same level as that in Example 1 and the conductivity was high by using a partially non-ionic dispersant. Further, this recording liquid had a zeta potential of −21.1 mV, a conductivity of 0.04 S/m, a number average particle size of 75.1 nm, a number of particles having a particle size of 0.5 $\mu$m or more present in one liter of $8.3 \times 10^{10}$, a volume average particle size of 143.2 nm, a viscosity of 2.9 mPa·s, a surface tension of 44 mN/m, a pH of 9.0, a Si concentration of 4 ppm, a Fe concentration of 1 ppm, and a Ca concentration of 3 ppm.

Comparative Example 4

An aqueous ink jet recording liquid having a composition shown below was obtained using the preparation method 1 of water-insoluble coloring material dispersion.

| | |
|---|---|
| Carbon black (Raven 1060/manufactured by Columbian Carbon Co. Ltd./no washing) | 5 parts by weight |
| Styrene-methacrylic acid-sodium methacrylate copolymer (formulating ratio: 33/67, Na salt 95% neutralized, SP value: 11.7, weight average molecular weight: 7000) | 0.3 parts by weight |
| polyoxyethylenenonylphenyl ether (SP value: 9.7, weight average molecular weight: 660) | 0.2 parts by weight |
| Glycerin (SP value: 20.2) | 15 parts by weight |
| Surfactant (Pluronic PE6400/manufactured by BASF Co.) | 0.03 parts by weight |
| pH buffer (N,N-Bis(2-hydroxyethyl)-2-aminoethasulfonic acid) | 1.5 parts by weight |
| Isopropyl alcohol (SP value: 11.6) | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid was prepared so that the particle size was large by combining carbon black with a dispersant. Further, this recording liquid had a zeta potential of −21.1 mV, a conductivity of 0.40 S/m, a number average particle size of 208.0 nm, a number of particles having a particle size of 0.5 $\mu$m or more present in one liter of $6.2 \times 10^{11}$, a volume average particle size of 330.1 nm, a viscosity of 2.8 mPa·s, a surface tension of 46 mN/m, a pH of 8.9, a Si concentration of 3 ppm, a Fe concentration of 1 ppm, and a Ca concentration of 3 ppm.

Comparative Example 5

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-methacrylic acid-sodium methacrylate copolymer (formulating ratio: 33/67, Na salt 95% neutralized, SP value: 11.7, weight average molecular weight: 7000) | 0.5 parts by weight |
| Surfactant (Pluronic PE6400/manufactured by BASF Co.) | 0.03 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid was prepared without using a water-insoluble organic solvent. Further, this recording liquid had a zeta potential of −52.2 mv, a conductivity of 0.16 S/m, a number average particle size of 32.2 nm, a number of particles having a particle size of 0.5 $\mu$m or more present in one liter of $1.1 \times 10^{10}$, a volume average particle size of 72.7 nm, a viscosity of 1.4 mPa·s, a surface tension of 50 mN/m, a pH of 8.9, a Si concentration of 2 ppm, a Fe concentration of 1 ppm, and a Ca concentration of 4 ppm.

Comparative Example 6

An aqueous ink jet recording liquid having a composition shown below was obtained using the preparation method 1 of water-insoluble coloring material dispersion.

| | |
|---|---|
| Carbon black (Raven 780 manufactured by Columbian Carbon Co., Ltd./washed) | 5 parts by weight |
| n-butyl methacrylate-acrylic acid-sodium acrylate copolymer (SP value: 10.7, weight average molecular weight: 7500) | 0.5 parts by weight |
| Glycerin (SP value: 20.2) | 5 parts by weight |
| Ethanol (SP value: 12.6) | 4 parts by weight |
| 2-(2-ethoxyethoxy)ethanol (SP value: 10.9) | 10 parts by weight |
| Surfactant (Surfynol 465/manufactured by Nisshin Chemical Industry Co., Ltd.) | 0.03 parts by weight |
| Deionized water | remainder |
| Total: | 100 parts by weight |

This recording liquid had a zeta potential of −18.3 mV, a conductivity of 0.15 S/m, a number average particle size of 68.2 nm, a number of particles having a particle size of 0.5 $\mu$m or more present in one liter of $7.0 \times 10^{10}$, a volume average particle size of 162.5 nm, a viscosity of 2.6 mPa·s, a surface tension of 45 mN/m, a pH of 8.2, a Si concentration of 1.3 ppm, a Fe concentration of 0.6 ppm, and a Ca concentration of 1.0 ppm.

Various physical properties such as the zeta potential and the like of the ink jet recording liquid in the above-described examples are shown in Table 2.

A variation ratio within or equal to ±10% was evaluated as ○, within or equal to ±30% as Δ, and exceeding ±30% as ×.

As a printing apparatus, an experimentally manufactured print head of 400 dpi with 160 nozzles was used, and as the recording material, ordinary paper for Fuji Xerox copies was used. Printing and evaluations were carried out under general environmental conditions (temperature 23±0.5° C., humidity 55±5% R.H) unless otherwise stated.

An evaluation of stability over long periods of time in the print head was conducted as follows. An ink cartridge filled with the ink was installed in an ink jet recording apparatus, and the apparatus was allowed to stand at 40° C. and 50% R. H for three months. Printing was conducted using this apparatus under usual use conditions, and that which could conduct total jet printing was evaluated as ○. On the other hand, that which caused print void or the like under usual use conditions but could conduct total jet printing by repeating vacuum maintenance was evaluated as Δ, and that which wherein a nozzle which could not recover by vacuum maintenance alone was produced was evaluated as X.

To evaluate nozzle clogging, printing was conducted using a print head which had been allowed to stand for a given period of time after forceful maintenance, and the time until a printing failure occurred was measured. If the time until a failure occurred was 900 seconds or more, the evaluation was ○, if 60 seconds or more, Δ, and if shorter than 60 seconds, ×.

To evaluate kogation, an experimentally manufactured ink cartridge was filled with ink, printing was conducted

TABLE 2

| | Zeta potential (mV) | Conductivity (S/m) | Number average particle size (nm) | Number of particles having a particle size of 0.5 $\mu$m or more × $10^{10}$ | Volume average particle size (nm) | Si concentration (ppm) | Fe concentration (ppm) | Ca concentration (ppm) | Other items |
|---|---|---|---|---|---|---|---|---|---|
| Example 1 | −30.3 | 0.12 | 30.5 | 0.82 | 62.5 | 4 | 1 | 4 | — |
| Example 2 | −36.2 | 0.16 | 63.1 | 2.1 | 131.4 | 3 | 1 | 3 | — |
| Example 3 | −22.5 | 0.23 | 38.4 | 4.3 | 83.9 | 5 | 2 | 22 | — |
| Example 4 | −26.5 | 0.21 | 42.2 | 5.2 | 93.3 | 23 | 1 | 4 | — |
| Example 5 | −20.3 | 0.34 | 40.1 | 5.1 | 88.7 | 4 | 25 | 4 | — |
| Comparative example 1 | −12.7 | 0.07 | 82.6 | 29 | 211.2 | 4 | 1 | 4 | — |
| Comparative example 2 | −9.3 | 0.77 | 43.2 | 5.5 | 87.3 | 3 | 1 | 4 | — |
| Comparative example 3 | −21.1 | 0.04 | 75.1 | 8.3 | 143.2 | 4 | 1 | 3 | — |
| Comparative example 4 | −21.1 | 0.40 | 208.0 | 62 | 330.1 | 3 | 1 | 3 | — |
| Comparative example 5 | −52.2 | 0.16 | 32.2 | 1.1 | 72.7 | 2 | 1 | 4 | Viscosity × |
| Comparative example 6 | −18.3 | 0.15 | 68.2 | 7.0 | 162.5 | 1.3 | 0.6 | 1 | — |

Further, evaluation results of storage stability, stability over long periods of time, nozzle clogging, kogation, rub resistance, lightfastness, image bleeding and optical density of each of the recording liquids are shown in Tables 3 and 4.

Evaluation Method

To evaluate storage stability of the ink, the ink was injected into a sample tube, 5 cycles of 60° C. for 2 hours and −20° C. for 2 hours were conducted, and the number of coarse particles having a particle size of 0.5 $\mu$m or more in the ink was measured before and after the heat, cold cycles.

with $1 \times 10^8$ pulses using the experimentally manufactured ink jet recording apparatus, and the optical density of the recorded material in initial printing, and the optical density of the recorded material after printing with $1 \times 10^8$ pulses were measured, respectively. When the variation ratio of the optical density before and after printing with $1 \times 10^8$ pulses was within or equal to ±5%, it was evaluated as ○; within or equal to ±10% was evaluated as Δ, and exceeding ±10% was evaluated as ×. Further, the optical density was measured using an X-rite 404 (manufactured by X-rite, Inc.).

The experimentally manufactured ink cartridge was filled with the ink to be evaluated, and a 100% coverage pattern was printed on FX-L paper (manufactured by Fuji Xerox Co., Ltd.) using the experimentally manufactured recording apparatus and was allowed to stand under general environmental conditions for 24 hours. Rub resistance, water resistance, lightfastness, image bleeding, and optical density were respectively evaluated using this recorded material.

To evaluate rub resistance, other white FX-L paper was pressed onto the recorded material with a load of $4.9 \times 10^7$ N/m$^2$, and ink transferred to the white FX-L paper was evaluated by the naked eye while referring to the boundary samples previously defined.

To evaluate lightfastness, the recorded material was irradiated with a xenon lamp for 8 hours, and when the ratio of the optical density before irradiation to the optical density after irradiation was over 95% or more, the evaluation was ○, and when less than 95%, the evaluation was X. Further, the measurement of the optical density was conducted using the X-rite 404 (manufactured by X-rite, Inc.).

To evaluate water resistance, the recorded material was immersed in water for 1 minute, and thereafter allowed to stand under general environmental conditions for 24 hours. The optical density was measured before and after the immersion into water, and a ratio thereof of 95% or more was evaluated as ○, and a ratio thereof of less than 95% was evaluated as Further, measurement of the optical density was conducted using the X-rite 404 (manufactured by X-rite, Inc.).

Regarding image bleeding, as compared with limit samples previously defined, when image bleeding was slight, evaluation was ○, and when image bleeding w as serious, evaluation was x.

The optical density of the recorded material was measured using the X-rite 404 (manufactured by X-rite, Inc.), and when the optical density was 1.2 or more, evaluation was ○, and when less than 1.2, evaluation was x.

To evaluate storage stability at high temperatures, when the number of coarse particles having a particle size of 0.5 μm or more present in one liter of the ink after storage for 300 hours at 60° C. was $2.5 \times 10^{11}$ or less, the evaluation was ○, when from $2.5 \times 10^{11}$ to less than $3.5 \times 10^{11}$, the evaluation was Δ, and when $3.5 \times 10^{11}$ or more, the evaluation was x.

TABLE 3

| | Storage stability | Stability over long periods of time | Nozzle clogging | Kogation |
|---|---|---|---|---|
| Example 1 | ○ | ○ | ○ | ○ |
| Example 2 | ○ | ○ | ○ | ○ |
| Example 3 | Δ | ○ | ○ | ○ |
| Example 4 | Δ | ○ | ○ | ○ |
| Example 5 | Δ | ○ | ○ | ○ |
| Comparative example 1 | X | X | X | X |
| Comparative example 2 | X | X | X | X |
| Comparative example 3 | X | X | Δ | Δ |
| Comparative example 4 | X | X | X | X |
| Comparative example 5 | ○ | X | X | ○ |
| Comparative example 6 | X | X | X | X |

TABLE 4

| | Rub Resistance | Light fastness | Water resistance | Image bleeding | Optical density | Storage stability at high temperatures |
|---|---|---|---|---|---|---|
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | Δ | ○ | ○ | ○ | ○ | ○ |
| Example 5 | Δ | ○ | ○ | ○ | ○ | ○ |
| Comparative example 1 | X | ○ | ○ | ○ | ○ | X |
| Comparative example 2 | X | ○ | ○ | ○ | ○ | X |
| Comparative exmaple 3 | X | ○ | ○ | ○ | ○ | Δ |
| Comparative example 4 | X | ○ | ○ | ○ | ○ | Δ |
| Comparative example 5 | ○ | ○ | ○ | X | X | Δ |
| Comparative example 6 | ○ | ○ | ○ | X | X | X |

Example 6

An aqueous ink jet recording liquid having a composition shown below was obtained using the preparation method 1 of water-insoluble coloring material dispersion.

| | |
|---|---|
| C.I. Pigment Blue 15:3 (washed) | 4 parts by weight |
| Styrene styrenesulfonic acid-potassium styrenesulfonate copolymer (monomer formulating ratio: 50/50) | 1.0 parts by weight |
| Diethylene glycol | 15 parts by weight |
| Sulfolane | 5 parts by weight |
| Surfactant (Surfynol 465/manufactured by Nisshin Chemical Industry Co., Ltd.) | 3 parts by weight |
| Potassium hydroxide | (note) |
| Deionized water | remainder |
| Total: | 100 parts by weight |

(Note) Potassium hydroxide was added so that the pH of the ink ultimately obtained was 9.2.

This recording liquid had a zeta potential of −38.2 mV, a conductivity of 0.35 S/m, a number average particle size of 83.4 nm, a number of particles having a particle size of 0.5 pm or more present in one liter of $1.0 \times 10^{11}$, a volume average particle size of 237.6 nm, a viscosity of 2.9 mPa·s, a surface tension of 34 mN/m, a pH of 9.2, a Si concentration of 8 ppm, a Fe concentration of 5 ppm, and a Ca concentration of 6 ppm.

Example 7

An aqueous ink jet recording liquid having a composition shown below was obtained using the preparation method 1 of water-insoluble coloring material dispersion.

| | |
|---|---|
| C.I. Pigment Blue 15:3 (washed) | 4 parts by weight |
| Vinylnaphthalene-acrylic acid-potassium acrylate copolymer (monomer formulating ratio: 33/67) | 1.0 parts by weight |
| Diethylene glycol | 15 parts by weight |
| Sulfolane | 5 parts by weight |
| Surfactant (Surfynol 485/manufactured by Nisshin Chemical Industry Co., Ltd.) | 4 parts by weight |

-continued

| | |
|---|---|
| Potassium hydroxide | (note) |
| Deionized water | remainder |
| Total: | 100 parts by weight |

(Note) Potassium hydroxide was added so that the pH of the ink ultimately obtained was 9.1.

This recording liquid had a zeta potential of −25.4 mV, a conductivity of 0.38 S/m, a number average particle size of 95.0 nm, a number of particles having a particle size of 0.5 µm or more present in one liter of $1.3 \times 10^{11}$, a volume average particle size of 247.6 nm, a viscosity of 3.0 mPa·s, a surface tension of 33 mN/m, a pH of 9.1, a Si concentration of 8 ppm, a Fe concentration of 4 ppm, and a Ca concentration of 4 ppm.

Example 8

An aqueous ink jet recording liquid having a composition shown below was obtained using the preparation method 1 of water-insoluble coloring material dispersion.

| | |
|---|---|
| C.I. Pigment Blue 15:3 (washed) | 4 parts by weight |
| 2-Ethylhexyl methacrylate-benzyl methacrylate-acrylic acid-potassium acrylate copolymer (monomer formulating ratio: 45/5/50) | 1.0 parts by weight |
| Diethylene glycol | 15 parts by weight |
| Diethylene glycol monobutyl ether | 5 parts by weight |
| Surfactant (Pluronic PE65/manufactured by BASF Co.) | 3 parts by weight |
| Potassimn hydroxide | (note) |
| Deionized water | remainder |
| Total: | 100 parts by weight |

(Note) Potassium hydroxide was added so that the pH of the ink ultimately obtained was 9.0.

This recording liquid had a zeta potential of −24.7 mV, a conductivity of 0.33 S/m, a number average particle size of 92.8 nm, a number of particles having a particle size of 0.5 µm or more present in one liter of $1.8 \times 10^{11}$, a volume average particle size of 245.2 nm, a viscosity of 3.0 mPa·s, a surface tension of 33 mN/m, a pH of 9.0, a Si concentration of 7 ppm, a Fe concentration of 4 ppm, and a Ca concentration of 7 ppm.

Example 9

An aqueous ink jet recording liquid having a composition shown below was obtained using the preparation method 1 of water-insoluble coloring material dispersion.

| | |
|---|---|
| C.I. Pigment Red 122 (washed) | 4 parts by weight |
| Styrene-styrenesulfonic acid-sodium styrenesulfonate copolymer (monomer formulating ratio: 50/50) | 0.5 parts by weight |
| Propylene glycol | 15 parts by weight |
| Thiodiethanol | 5 parts by weight |
| Surfactant (surfynol 465/manufactured by Nisshin Chemical Industry Co., Ltd.) | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid had a zeta potential of −37.5 mV, a conductivity of 0.34 S/m, a number average particle size of 83.3 nm, a number of particles having a particle size of 0.5 µm or more present in one liter of $9.7 \times 10^{11}$, a volume average particle size of 231.5 nm, a viscosity of 2.9 mPa·s, a surface tension of 34 mN/m, a pH of 8.9, a Si concentration of 5 ppm, a Fe concentration of 2 ppm, and a Ca concentration of 3 ppm.

Example 10

An aqueous ink jet recording liquid having a composition shown below was obtained using the preparation method 1 of water-insoluble coloring material dispersion.

| | |
|---|---|
| C.I. Pigment Yellow 17 (washed) | 4 parts by weight |
| Styrene-styrenesulfonic acid-sodium styrenesulfonate copolymer (monomer formulating ratio: 50/50) | 0.5 parts by weight |
| Propylene glycol | 15 parts by weight |
| Diethylene glycol monobutyl ether | 5 parts by weight |
| Surfactant (Surfynol 465/manufactured by Nisshin Chemical Industry Co., Ltd.) | 3 parts by weight |
| Sodium hydroxide | (note) |
| Deionized water | remainder |
| Total: | 100 parts by weight |

(Note) Potassium hydroxide was added so that the pH of the ink ultimately obtained was 8.7.

This recording liquid had a zeta potential of −36.6 mV, a conductivity of 0.35 S/m, a number average particle size of 86.0 nm, a number of particles having a particle size of 0.5 µm or more pressent in one liter of $1.1 \times 10^{11}$, a volume average particle size of 234.2 nm, a viscosity of 2.8 mPa·s, a surface tension of 35 mN/m, a pH of 8.7, a Si concentration of 6 ppm, a Fe concentration of 3 ppm, and a Ca concentration of 5 ppm.

Example 11

An aqueous ink jet recording liquid having a composition shown below was obtained using the preparation method 1 of water-insoluble coloring material dispersion.

| | |
|---|---|
| Carbon black (Black Pearls L/manufactured by Cabot Corp./washed) | 5 parts by weight |
| Styrene-acrylic acid-lithium acrylate copolymer (monomer formulating ratio: 33/67) | 0.5 parts by weight |
| Diethylene glycol | 10 parts by weight |
| Diglycerin ethylene oxide adduct | 5 parts by weight |
| Urea | 3 parts by weight |
| Surfactant (Pluronic PE6400/manufactured by BASF Co.) | 0.1 parts by weight |
| Lithium hydroxide | (note) |
| Deionized water | remainder |
| Total: | 100 parts by weight |

(Note) Lithium hydroxide was added so that the pH of the ink ultimately obtained was 8.7.

This recording liquid had a zeta potential of −26.9 mV, a conductivity of 0.15 S/m, a number average particle size of 35.1 nm, a number of particles having a particle size of 0.5 µm or more present in one liter of $1.2 \times 10^{10}$, a volume average particle size of 75.3 nm, a viscosity of 2.8 mPa·s, a surface tension of 45 mN/m, a pH of 8.7, a Si concentration of 3 ppm, a Fe concentration of 1 ppm, and a Ca concentration of 2 ppm.

Example 12

An aqueous ink jet recording liquid having a composition shown below was obtained using the preparation method 1 of water-insoluble coloring material dispersion.

| | |
|---|---|
| Carbon black (Regal 330R/manufactured by Cabot Corp./washed) | 5 parts by weight |
| Styrene-styrenesulfonic acid-methacrylic acid block copolymer sodium neutralized salt (monomer formulating ratio: 20/40/40) | 1.5 parts by weight |
| Thiodiethanol | 15 parts by weight |
| Thiourea | 3 parts by weight |
| Surfactant (Surfynol TG/manufactured by BASF Co.) | 0.1 parts by weight |
| Sodium hydroxide | (note) |
| Deionized water | remainder |
| Total: | 100 parts by weight |

(Note) Sodium hydroxide was added so that the pH of the ink ultimately obtained was 8.8.

This recording liquid had a zeta potential of −33.5 mV, a conductivity of 0.18 S/m, a number average particle size of 43.1 nm, a number of particles having a particle size of 0.5 μm or more present in one liter of $2.3 \times 10^{10}$, a volume average particle size of 83.5 nm, a viscosity of 2.7 mPa·s, a surface tension of 44 mN/m, a pH of 8.8, a Si concentration of 5 ppm, a Fe concentration of 3 ppm, and a Ca concentration of 4 ppm.

Example 13

An aqueous ink jet recording liquid having a composition shown below was obtained using the preparation method 1 of water-insoluble coloring material dispersion.

| | |
|---|---|
| Carbon black (Raven 5250/manufactured by Columbian Carbon Co., Ltd./washed) | 5 parts by weight |
| Styrene-dimethylamino methacrylate-methacrylic acid-sodium methacrylate copolymer (monomer formulating ratio: 45/5/50) | 1.0 parts by weight |
| Diethylene glycol | 20 parts by weight |
| Propylene glycol monobutyl ether | 5 parts by weight |
| Fluorine-based surfactant (Fluorad FC-104/manufactured by 3M Corp.) | 0.05 parts by weight |
| t-Butyl alcohol | 1.5 parts by weight |
| Urea | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid had a zeta potential of −30.0 mv, a conductivity of 0.16 S/m, a number average particle size of 34.1 nm, a number of particles having a particle size of 0.5 μm or more present in one liter of $10 \times 10^{10}$, a volume average particle size of 78.2 nm, a viscosity of 3.2 mPa·s, a surface tension of 45 mN/M, a pH of 8.9, a Si concentration of 4 ppm, a Fe concentration of 3 ppm, and a Ca concentration of 3 ppm.

Example 14

An aqueous ink jet recording liquid having a composition shown below was obtained using the preparation method 1 of water-insoluble coloring material dispersion.

| | |
|---|---|
| Carbon black (Raven 1060/manufactured by Columbian Carbon Co., Ltd./no washing) | 5 parts by weight |
| Vinylnaphthalene-styrenesulfonic acid-sodium styrenesulfonate copolymer (monomer formulating ratio: 33/67) | 0.5 parts by weight |
| N-methyl-2-pyrrolidone | 10 parts by weight |
| Polymer emulsion (Joncryl 450/manufactured by Johnson Polymer Corp.) | 2 parts by weight |
| Triethenolamine | (note) |
| Deionized water | remainder |
| Total: | 100 parts by weight |

(Note) Triethenolamine was added so that the pH of the ink ultimately obtained was 8.1.

This recording liquid had a zeta potential of −41.1 mV, a conductivity of 0.10 S/m, a number average particle size of 60.2 nm, a number of particles having a particle size of 0.5 μm or more present in one liter of $6.4 \times 10^{10}$, a volume average particle size of 140.5 nm, a viscosity of 3.1 mPa·s, a surface tension of 51 mN/m, a pH of 8.1, a Si concentration of 3 ppm, a Fe concentration of 2 ppm, and a Ca concentration of 4 ppm.

Example 15

An aqueous ink jet recording liquid having a composition shown below was obtained according to the [Preparation method of aqueous ink jet recording liquid].

| | |
|---|---|
| Surface treated carbon black (Cab-o-jet-300/manufactured by Cabot Corp.) | 4 parts by weight |
| Propylene glycol | 10 parts by weight |
| Cylohexylpyrrolidone | 5 parts by weight |
| Surfactant (Pluronic PE10500/manufactured by BASF Co.) | 0.05 parts by weight |
| Isopropyl alcohol | 1.5 parts by weight |
| Urea | 3 parts by weight |
| Sodium hydroxide | (note) |
| Deionized water | remainder |
| Total: | 100 parts by weight |

(Note) Sodium hydroxide was added so that the pH of the ink ultimately obtained was 8.9.

This recording liquid had a zeta potential of −22.3 mV, a conductivity of 0.13 S/m, a number average particle size of 43.3 nm, a number of particles having a particle size of 0.5 μm or more present in one liter of $2.0 \times 10^{10}$, a volume average particle size of 90.4 nm, a viscosity of 2.4 mPa·s, a surface tension of 49 mN/m, a pH of 8.9, a Si concentration of 2 ppm, a Fe concentration of 1 ppm, and a Ca concentration of 2 ppm.

Example 16

An aqueous ink jet recording liquid having a composition shown below was obtained according to the [Preparation method of aqueous ink jet recording liquid].

| | |
|---|---|
| Surface treated carbon black (Cab-o-jet-300/manufactured by Cabot Corp.) | 4 parts by weight |
| Glycerin | 10 parts by weight |
| Sulfolane | 5 parts by weight |
| Surfactant (Surfynol 485/manufactured by Nisshin Chemical Industry Co., Ltd.) | 3 parts by weight |

-continued

| | |
|---|---|
| n-Butyl alcohol | 1.5 parts by weight |
| Thiourea | 3 parts by weight |
| Triethanolamine | (note) |
| Deionized water | remainder |
| Total: | 100 parts by weight |

(Note) Triethanolamine was added so that the pH of the ink ultimately obtained was 9.0.

This recording liquid had a zeta potential of −23.4 mV, a conductivity of 0.10 S/m, a number average particle size of 45.2 nm, a number of particles having a particle size of 0.5 μm or more present in one liter of $3.3 \times 10^{10}$, a volume average particle size of 95.3 nm, a viscosity of 2.5 mPa·s a surface tension of 48 mN/m, a pH of 9.0, a Si concentration of 2 ppm, a Fe concentration of 1 ppm, and a Ca concentration of 2 ppm.

Example 17

An aqueous ink jet recording liquid having a composition shown below was obtained according to the [Preparation method of aqueous ink jet recording liquid].

| | |
|---|---|
| Surface treated carbon black (CW-1/manufactured by Orient Chemical Industry Co., Ltd.) | 4 parts by weight |
| Ethylene glycol | 10 parts by weight |
| Thiodiethanol | 5 parts by weight |
| Surfactant (Surfynol 485/manufactured by Nisshin Chemical Industry Co., Ltd.) | 3 parts by weight |
| Thiourea | 3 parts by weight |
| t-Butyl alcohol | 1.5 parts by weight |
| Sodium hydroxide | (note) |
| Deionized water | remainder |
| Total: | 100 parts by weight |

(Note) Sodium hydroxide was added so that the pH of the ink ultimately obtained was 8.8.

This recording liquid had a zeta potential of −25.1 mV, a conductivity of 0.10 S/m, a number average particle size of 22.9 nm, a number of particles having a particle size of 0.5 μm or more present in one liter of $8.8 \times 10^9$, a volume average particle size of 43.5 nm, a viscosity of 2.2 mPa·s, a surface tension of 30 mN/m, a pH of 8.8, a Si concentration of 3 ppm, a Fe concentration of 1 ppm, and a Ca concentration of 3 ppm.

Each of the inks in Examples 6 to 17 satisfied all required conditions in the present invention. Further, these inks were excellent in regards to characteristics such as storage stability, stability over long periods of time, storage stability at high temperatures, nozzle clogging, kogation and the like, and were excellent in regards to printing qualities such as rub resistance, lightfastness, water resistance, image bleeding, optical density, density unevenness and the like.

What is claimed is:

1. An aqueous ink jet recording liquid comprising at least water, a water-soluble organic solvent and a water-insoluble coloring material, wherein
    (1) the absolute value of the zeta potential is 20 mv or more,
    (2) the conductivity is from 0.05 to 0.75 s/m,
    (3) the number average particle size of dispersed particles is from 15 to 200 nm,
    (4) the number of particles having a particle size of 0.5 μm or more present in one liter is $2.5 \times 10^{11}$ or less, and
    (5) the concentrations of Si, Fe and Ca contained in the aqueous ink jet recording liquid are 20 ppm or less, respectively.

2. An aqueous ink jet recording liquid according to claim 1, wherein the water-insoluble coloring material is a pigment.

3. An aqueous ink jet recording liquid according to claim 1, wherein the zeta potential of the recording liquid is −20 mV or less.

4. An aqueous ink jet recording liquid according to claim 1, wherein the conductivity of the recording liquid is from 0.10 to 0.50 S/m.

5. An aqueous ink jet recording liquid according to claim 1, wherein the number average particle size of the dispersed particles is from 20 to 80 nm.

6. An aqueous ink jet recording liquid according to claim 1, wherein the volume average particle size of the dispersed particles is from 30 to 250 nm.

7. An aqueous ink jet recording liquid according to claim 1, wherein the alkaline metal ion concentration is from 500 to 3000 ppm.

8. An aqueous ink jet recording liquid according to claim 1, wherein the conductivity of the recording liquid is from 0.10 to 0.50 S/m, the alkaline metal ion concentration is from 500 to 3000 ppm, the number average particle size of the dispersed particles is from 20 to 80 nm, and the volume average particle size of the dispersed particles is from 30 to 250 nm.

9. An aqueous ink jet recording liquid according to claim 1, wherein the percentage content of the water-soluble organic solvent is from 1 to 60% by weight.

10. An aqueous ink jet recording liquid according to claim 1, wherein the viscosity of the aqueous ink jet recording liquid is from 1.5 to 10 mPa·s.

11. An aqueous ink jet recording liquid according to claim 1, wherein the water-insoluble coloring material is contained in an amount from 0.5 to 20% by weight in regards to the aqueous ink jet recording liquid.

12. An aqueous ink jet recording liquid according to claim 1, wherein the aqueous ink jet recording liquid contains a polymeric dispersant.

13. An ink jet recording ink according to claim 12, wherein said polymeric dispersant is a polymer composed of a hydrophilic portion and a hydrophobic portion, said hydrophilic portion having a carboxylate group or a salt thereof, and has a solubility parameter from 10 to 13,
    said water-soluble organic solvent having a solubility parameter greater than or equal to 0.5 less than the solubility parameter of said polymeric dispersant, the contained amount of the water-soluble organic solvent having a solubility parameter within or equal to ±0.5 of the solubility parameter of said polymeric dispersant being 5% by weight or less based on the total weight of the ink, and the contained amount of the water-soluble organic solvent having a solubility parameter exceeding 0.5 more than the solubility parameter of said polymeric dispersant being 1 to 30% by weight based on the total weight of the ink.

14. An ink jet recording ink according to claim 13, wherein said polymeric dispersant is contained in an amount from 0.1 to 100 parts by weight based on 100 parts by weight of said water-insoluble coloring material.

15. An ink jet recording ink according to claim 13, wherein said polymeric dispersant is a polymer having a weight average molecular weight of from 3,000 to 20,000.

16. An ink jet recording ink according to claim 12, wherein said polymeric dispersant is contained in an amount from 5 to 80 parts by weight based on 100 parts by weight of said water-insoluble coloring material.

17. A water-soluble ink jet recording ink according to claim 1, wherein the pH of the aqueous ink jet recording liquid is from 3 to 11.

18. An ink jet recording method in which recording is conducted by discharging liquid drops of a recording liquid from an orifice according to recording signals, wherein, as said recording liquid, there is used an aqueous inkjet recording liquid comprising water, a water-soluble organic solvent and a water-insoluble coloring material, wherein
  (1) the absolute value of the zeta potential is 20 mv or more,
  (2) the conductivity is 0.05 to 0.75 s/m,
  (3) the number average particle size of dispersed particles is from 15 to 200 nm,
  (4) the number of particles having a particle size of 0.5 $\mu$m or more present in one liter is $2.5 \times 10^{11}$ or less, and
  (5) the concentrations of Si, Fe and Ca contained in the aqueous ink jet recording liquid are 20 ppm or less, respectively.

19. An ink jet recording method according to claim 18, wherein the ink is discharged by using a heating method.

20. An ink jet recording method according to claim 18, wherein the liquid drops are formed by an application of a plurality of pulses.

* * * * *